US010122168B2

(12) United States Patent
Goncalves et al.

(10) Patent No.: US 10,122,168 B2
(45) Date of Patent: Nov. 6, 2018

(54) POWER SUPPLY CURRENT PRIORITY BASED AUTO DE-RATING FOR POWER CONCURRENCY MANAGEMENT

(71) Applicant: QUALCOMM Incorporated, San Diego, CA (US)

(72) Inventors: Ricardo Goncalves, Chandler, AZ (US); Joshua Zazzera, Goodyear, AZ (US); Edgar Marti-Arbona, Chandler, AZ (US); Juha Oikarinen, San Jose, CA (US); Joseph Rutkowski, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 15/269,893

(22) Filed: Sep. 19, 2016

(65) Prior Publication Data
US 2017/0279271 A1    Sep. 28, 2017

Related U.S. Application Data

(60) Provisional application No. 62/313,631, filed on Mar. 25, 2016.

(51) Int. Cl.
| H02J 3/00 | (2006.01) |
| G05F 1/10 | (2006.01) |
| H02M 1/088 | (2006.01) |
| H02M 3/158 | (2006.01) |
| G06F 1/32 | (2006.01) |
| H02J 7/00 | (2006.01) |
| H02M 1/00 | (2006.01) |

(52) U.S. Cl.
CPC .................. *H02J 3/00* (2013.01); *G05F 1/10* (2013.01); *G06F 1/3206* (2013.01); *H02J 7/007* (2013.01);
(Continued)

(58) Field of Classification Search
CPC ... H02J 3/00; H02J 7/007; G05F 1/10; H02M 1/088; H02M 3/1582; H02M 3/1584;
(Continued)

(56) References Cited

U.S. PATENT DOCUMENTS 6,580,623 B1    6/2003 Williams et al.
8,330,435 B2    12/2012 Qiu et al.
(Continued)

OTHER PUBLICATIONS

International Search Report and Written Opinion—PCT/US2017/019339—ISA/EPO—dated Jun. 7, 2017.
(Continued)

*Primary Examiner* — Robert Deberadinis
(74) *Attorney, Agent, or Firm* — Qualcomm Incorporated/Seyfarth Shaw LLP

(57) ABSTRACT

An apparatus and method for to incrementally reduce (e.g., de-rate) a power supply voltage output (VOUT) of a regulator to multiple subsystems in response to detecting high power conditions in a client device is described. In one instance, multiple low power client devices and a high power consumption client device are coupled to a power grid of the power management system with a power management integrated circuit (PMIC) supplying power to the power grid. The PMIC includes a buck-or-boost switching regulator including a load current adjustment device to de-rate the high power consumption device when a sum of the current consumed by the high power consumption device and the low power client devices is above a predetermined threshold.

20 Claims, 18 Drawing Sheets

(52) U.S. Cl.
 CPC ......... *H02M 1/088* (2013.01); *H02M 3/1582* (2013.01); *H02M 3/1584* (2013.01); *H02M 2001/0003* (2013.01); *H02M 2003/1586* (2013.01)

(58) Field of Classification Search
 CPC .......... H02M 2001/0003; G06F 1/3206; G06F 2003/1586
 See application file for complete search history.

(56) References Cited

U.S. PATENT DOCUMENTS

| | | |
|---|---|---|
| 9,287,779 B2 | 3/2016 | Goncalves et al. |
| 2002/0196004 A1 | 12/2002 | Berson et al. |
| 2007/0096562 A1 | 5/2007 | Bainbridge et al. |
| 2008/0055946 A1 | 3/2008 | Lesso et al. |
| 2013/0154599 A1 | 6/2013 | Pan |
| 2013/0305071 A1 | 11/2013 | Nilsen et al. |
| 2014/0125303 A1 | 5/2014 | Dagan et al. |
| 2014/0152272 A1 | 6/2014 | Bazzani et al. |
| 2014/0218117 A1 | 8/2014 | Branca et al. |
| 2014/0239919 A1 | 8/2014 | Bernardon et al. |
| 2015/0069957 A1 | 3/2015 | Chang et al. |
| 2017/0279359 A1 | 9/2017 | Goncalves et al. |

OTHER PUBLICATIONS

ST: "Buck-Boost Converter using the STM32F334 Discovery Kit", Sep. 30, 2014, XP055391447, Retrieved from the Internet: URL:http://www.st.com/resource/en/application_note/dm00108726.pdf [retrieved on Jul. 17, 2017], 34 pages.

POWER SUPPLY CURRENT PRIORITY BASED AUTO DE-RATING FOR POWER CONCURRENCY MANAGEMENT

CROSS-REFERENCE TO RELATED APPLICATION

The present application claims the benefit of U.S. Provisional Patent Application No. 62/313,631, filed on Mar. 25, 2016, and titled "POWER SUPPLY CURRENT PRIORITY BASED AUTO DE-RATING FOR POWER CONCURRENCY MANAGEMENT," the disclosure of which is expressly incorporated by reference herein in its entirety.

TECHNICAL FIELD

The present disclosure generally relates to power management integrated circuits (PMICs). More specifically, aspects of the present disclosure relate to PMICs including priority based auto de-rating or power concurrency management.

BACKGROUND

Many modern electronic systems specify some form of power conversion and rely on one or more batteries for power. The batteries are recharged, for example, by connecting the system to a power source (e.g., an alternating current (AC) power outlet) via a power adapter and cable.

A voltage regulator may provide a power supply rail from a battery. The voltage regulator increasingly has to service multiple subsystems (e.g., loads) in electronic devices. These subsystems may have different power supply voltage specifications and load current specifications. The power delivery capability of the voltage regulator, however, is limited by the power available from the battery. Under certain conditions, the voltage regulator may not be able to provide sufficient power to meet all the demands of all the subsystems. When load currents of multiple subsystems increase, the power supply voltage at the output of the regulator ($V_{OUT}$) may droop, causing one or more subsystems to fail.

SUMMARY

In an aspect of the present disclosure, a power management system includes multiple low power client devices and a high power consumption client device coupled to a power grid of the power management system. The power management system also includes a power management integrated circuit (PMIC) supplying power to the power grid. The PMIC includes a buck-or-boost switching regulator circuit. The buck-or-boost switching regulator circuit includes a load current adjustment device to de-rate the high power consumption device when a sum of the current consumed by the high power consumption device and the low power client devices is above a predetermined threshold.

In another aspect of the present disclosure, a power management method includes de-rating a high power consumption device when a current consumed by the high power consumption device is above a predetermined high power device threshold. The method also includes adjusting a voltage allocated to the high power consumption device according to a voltage headroom when a predetermined minimum voltage to operate each of a group of low power client devices coupled to a power grid is satisfied.

In still another aspect of the present disclosure, a power management system is presented. The power management system includes multiple low power client devices and a high power consumption client device coupled to a power grid of the power management system. The power management system also includes means for de-rating the high power consumption device when a current consumed by the high power consumption device is above a predetermined high power device threshold. The power management system also includes means for adjusting a voltage allocated to the high power consumption device according to a voltage headroom when a predetermined minimum voltage to operate each of the multiple low power client devices coupled to the power grid is satisfied.

In yet another aspect of the present disclosure, a non-transitory computer-readable storage medium for power management includes non-transitory program code recorded thereon which, when executed by the processor(s), causes the processor(s) to de-rate a high power consumption device when a current consumed by the high power consumption device is above a predetermined high power device threshold. The program code also causes the processor(s) to adjust a voltage allocated to the high power consumption device according to a voltage headroom when a predetermined minimum voltage to operate each of multiple low power client devices coupled to a power grid is satisfied.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR" and the use of the term "or" is intended to represent an "exclusive OR".

Some aspects of the disclosure include logic implemented on a control device to incrementally reduce (e.g., de-rate) a power supply voltage output ($V_{OUT}$) of a regulator to multiple subsystems in response to detecting high power conditions in a client device. When the power monitored in the electronic device increases, the logic detects the increase in power. Then, the logic can compare the power to a set of thresholds. The thresholds may be set below an absolute limit threshold at which the client device may not operate properly if the absolute limit is met. When a first threshold is met, the output voltage of the regulator may be incrementally decreased until a minimum voltage level is reached. When a second threshold is met, the output voltage may be incrementally increased until a maximum voltage level is reached. The minimum and maximum voltage levels may be based on minimum operating voltages from a set of subsystems and also priority levels associated with those subsystems. The priority levels may be used to define the minimum voltage where a first level is a maximum of all minimum operating voltages that are specified for all subsystems and a second level is a maximum of minimum operating voltages that are specified for certain higher priority subsystems.

System Overview

Figure 1:
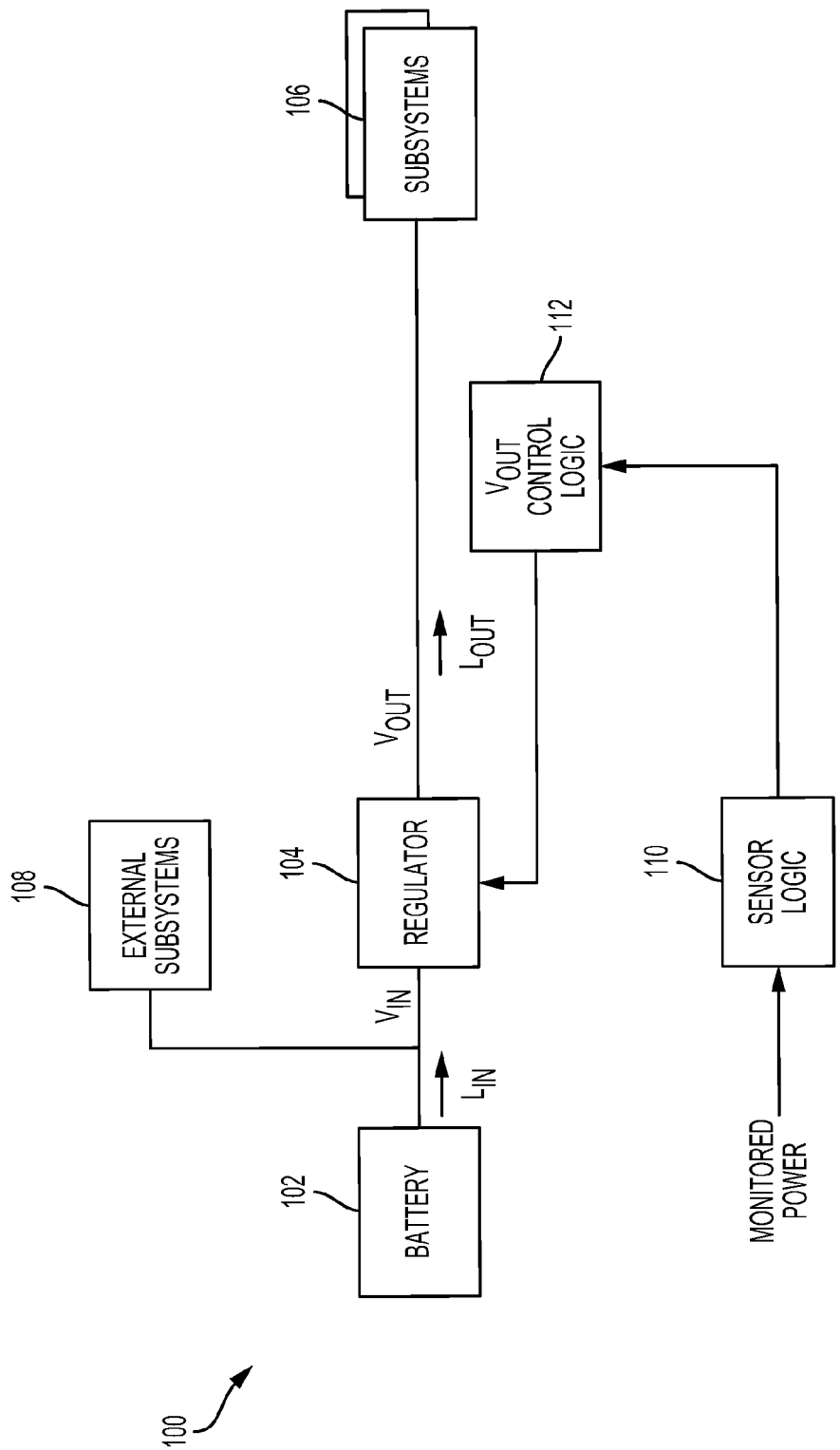
FIG. 1 depicts a simplified system for delivering power in an electronic device according to one aspect of the disclosure.

FIG. 1 depicts a simplified system 100 for delivering power in an electronic device according to one aspect of the disclosure. The system 100 includes a battery 102 that may provide a power supply voltage from outside a chip including a regulator 104. The regulator 104 may deliver a power supply voltage (e.g., a voltage rail) from a battery 102 to different subsystems 106. Also, other subsystems 108 may be located external to the chip that includes the regulator 104. The subsystems 108 may not draw power from the regulator 104, but may still draw power from the battery 102.

The system 100 may be part of an electronic device, such as a cellular phone, tablet, or other mobile device. In one aspect, the regulator 104 is highly integrated in the electronic device with the subsystems 106 and the subsystems 108. In one aspect, the regulator 104 may be a buck regulator, a boost regulator, and/or a buck-or-boost regulator. The regulator 104 regulates the output voltage $V_{OUT}$ from the regulator 104 to different subsystems 106. For example, in the boost mode, the regulator 104 may increase the level of an input voltage $V_{IN}$ that is received from the battery 102. Also, in the buck mode, the regulator 104 may decrease the level of the input voltage $V_{IN}$ that is received from the battery 102.

The system 100 includes various subsystems 106 (e.g., loads or client devices) that draw power from the regulator 104. These subsystems 106 may include different minimum power supply voltage specifications. For example, the minimum operating voltage may be a level below which the subsystems may no longer operate properly. The subsystems 106 may draw different levels of power (e.g., current and/or voltage) at different times depending on the operations the subsystems are performing. Further, different subsystems may draw power at different times, such as a subsystem may draw significant power when actively performing an operation, but not draw a lot of power when idle. For example, a client device such as an electric flash on a camera may draw a large current for a short time when the flash is operated, a WiFi, a camera sensor, red green blue and white (RGBW) indicators, secure digital (SD)/universal flash storage (UFS), main memory storage, or a cellular subsystem may draw a large current during transmission, or a computer processor may draw a large current while processing a large instruction block.

In a highly-integrated system, such as a mobile phone or tablet computer, the power delivery capability of the regulator 104 is limited by the power available from the battery 102. Under certain conditions, the regulator 104 may not be able to provide sufficient power to meet all the demands of the subsystems 106. When the power specified for multiple subsystems increases past the available power, the power supply voltage at the output of the regulator 104 may droop, causing one or more of the subsystems 106 to fail.

A sensor logic device 110 and a $V_{OUT}$ control logic device 112 adjust the output voltage $V_{OUT}$ such that the regulator 104 is able to provide sufficient power to the subsystems 106. In some implementations, the sensor logic device 110 and the $V_{OUT}$ control logic device may be part of the regulator 104. The sensor logic device 110 monitors power in the electronic device and uses multiple thresholds to determine when to increase or decrease the output voltage $V_{OUT}$ of the regulator 104. The thresholds may be set below an absolute limit threshold in which the electronic device may not operate properly if the absolute limit is met. The $V_{OUT}$ control logic device 112 controls the output voltage $V_{OUT}$ by increasing or decreasing the output voltage in increments. The output voltage $V_{OUT}$ may only be decreased to the minimum voltage level or increased to a maximum voltage level. These levels are based on voltage levels requested from a set of the subsystems and priority levels associated with those subsystems.

Figure 2:
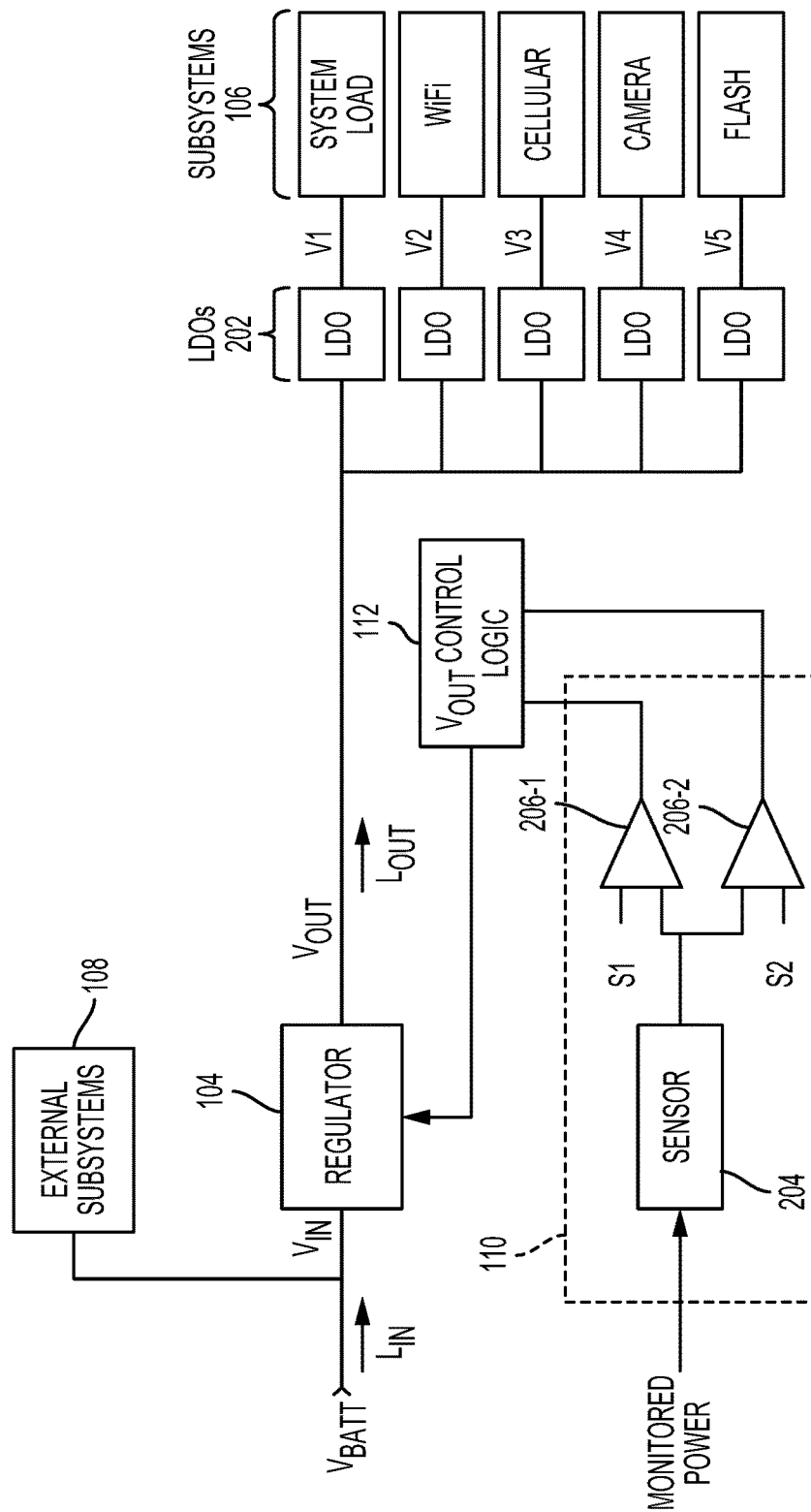
FIG. 2 depicts a more detailed example of the system according to one aspect of the disclosure.

FIG. 2 depicts a more detailed example of the system 100 according to one aspect of the disclosure. In this example, an implementation of the sensor logic device 110 is shown, but it will be recognized that other implementations will be appreciated. For example, the sensor logic device 110 may be implemented in analog circuits, digital circuits, and/or software.

The regulator 104 receives a battery voltage Vbatt (or current Iin) from the battery 102, and provides an output voltage $V_{OUT}$ (or current Iout) to low drop-out (LDO) regulators 202 that customize the internal power supply voltage to each subsystem 106. For example, a system load may specify a voltage V1, a WiFi subsystem may specify a voltage V2, a cellular subsystem may specify a voltage V3, a camera subsystem may specify a voltage V4, and a flash subsystem may specify a voltage V5. These voltages may be the minimum voltage specified for the subsystems to operate properly. For example, if the output voltage dips below this level, a subsystem may experience decreased performance. However, in some cases, the subsystem may not experience a total failure.

Each of these subsystems may be assigned a priority from multiple different priorities. For example, a first higher priority is defined as a "priority level 1" and a second lower priority is defined as a "priority level 0". The minimum and maximum output voltage $V_{OUT}$ levels of the regulator 104 are generated based on the priorities and the power supply voltages requested by the subsystems 106. For example, a minimum allowable $V_{OUT}$ level is defined by the requested power supply voltages of the subsystems 106 that are designated as "priority level 1". In one example, the WiFi subsystem may specify 3.6 V to operate properly, but other subsystems 106, such as the system load, may specify only 3.3 V. The WiFi subsystem may be designated as a low priority load and assigned priority level 0 and the system load is designated as a high priority level 1. In this case, during high power loading, it may be acceptable to reduce the power supply output voltage $V_{OUT}$ to be lower than 3.6 V (the level specified by WiFi), but not less than 3.3 V (the level specified by the system load). This reduced voltage may reduce the performance of the WiFi subsystem, but the user impact might be minimal. In this case, as long as the power supply voltage is above 3.3 V, the priority level 1 of the subsystems 106 may operate properly, but the WiFi subsystem may possibly operate at a reduced performance. Because WiFi is considered a lower priority, the reduced performance is tolerated and may not noticeably impact a user of the electronic device. At the expense of reduced performance of the WiFi subsystem, a shutdown of any subsystem or the entire electronic device may be avoided.

The sensor logic device 110 includes a sensor 204 that monitors the power from one or more locations in the electronic device. The locations may be at the input of the regulator 104, the output of the regulator 104, within the regulator 104, the output of the battery 102, and the input of the external subsystems 108. In one aspect, sensor 204 monitors the input current through the regulator 104, such as through an inductor of the regulator 104. In other examples, either the current or the voltage output by the battery 102 or input to the external subsystems 108 may be monitored.

Comparison logic device shown as a first comparator 206-1 and a second comparator 206-2 receive the monitored power and can compare the monitored power to different thresholds. For example, comparator 206-1 compares the power to a first threshold S1 and second comparator 206-2 compares the power to a second threshold S2. The first threshold S1 and the second threshold S2 may be early warning levels that control the automatic adjustment of the output voltage of the regulator 104. A third absolute threshold Lim may be an absolute threshold in which the system may stop operating properly if the power goes above this limit. In this case, the electronic device or a subsystem may need to be shut down or other undesirable measures taken. In one example, the thresholds may be current thresholds if current is monitored, such as the first threshold S1 is 3.5 A, the second threshold S2 is 3 A, and the absolute threshold Lim may be 4 A. Other thresholds may also be used, such as power or voltage thresholds. That is, the absolute threshold Lim is above the threshold S1, which is above the threshold S2. By providing the other thresholds S1 and S2, the $V_{OUT}$ control logic device 112 may adjust the output voltage $V_{OUT}$ of the regulator 104 such that the threshold Lim may not be reached. This may avoid an undesirable shutdown of components of the electronic device.

When the monitored power meets the first threshold S1 (is equal to and/or above), comparator 206-1 outputs a signal, such as a "high" signal to the $V_{OUT}$ control logic device 112. Also, when the monitored power meets the second threshold S2 (e.g., is equal to or below); comparator 206-2 outputs a high signal to the $V_{OUT}$ control logic device 112. Conversely, when the power dips below the first threshold or above the second threshold, comparators 206-1 and 206-2, respectively, output a "low" signal to the $V_{OUT}$ control logic device 112.

When threshold S1 is met, the $V_{OUT}$ control logic device 112 may send a signal to the regulator 104 to step the output voltage $V_{OUT}$ down an increment. The increment may be preset and may be around 32 millivolt (mV)/6 microseconds (µs). When the threshold S2 is met, then the $V_{OUT}$ control logic device 112 may output a signal to the regulator 104 to increase the output voltage by an increment, such as by the same 32 mV/6 µs increment. Each time one of the thresholds is met, then the $V_{OUT}$ control logic device 112 may signal the regulator 104 to adjust the output voltage by another increment. In one aspect, once the threshold is hit and goes above or below the threshold, the signal should be cleared before it can be met again. In other aspects, at every clock cycle, the power is checked, and if one of the thresholds is met, the signal is asserted again.

Graphical Examples of Comparison and Output Voltage Adjustment

Figure 3:
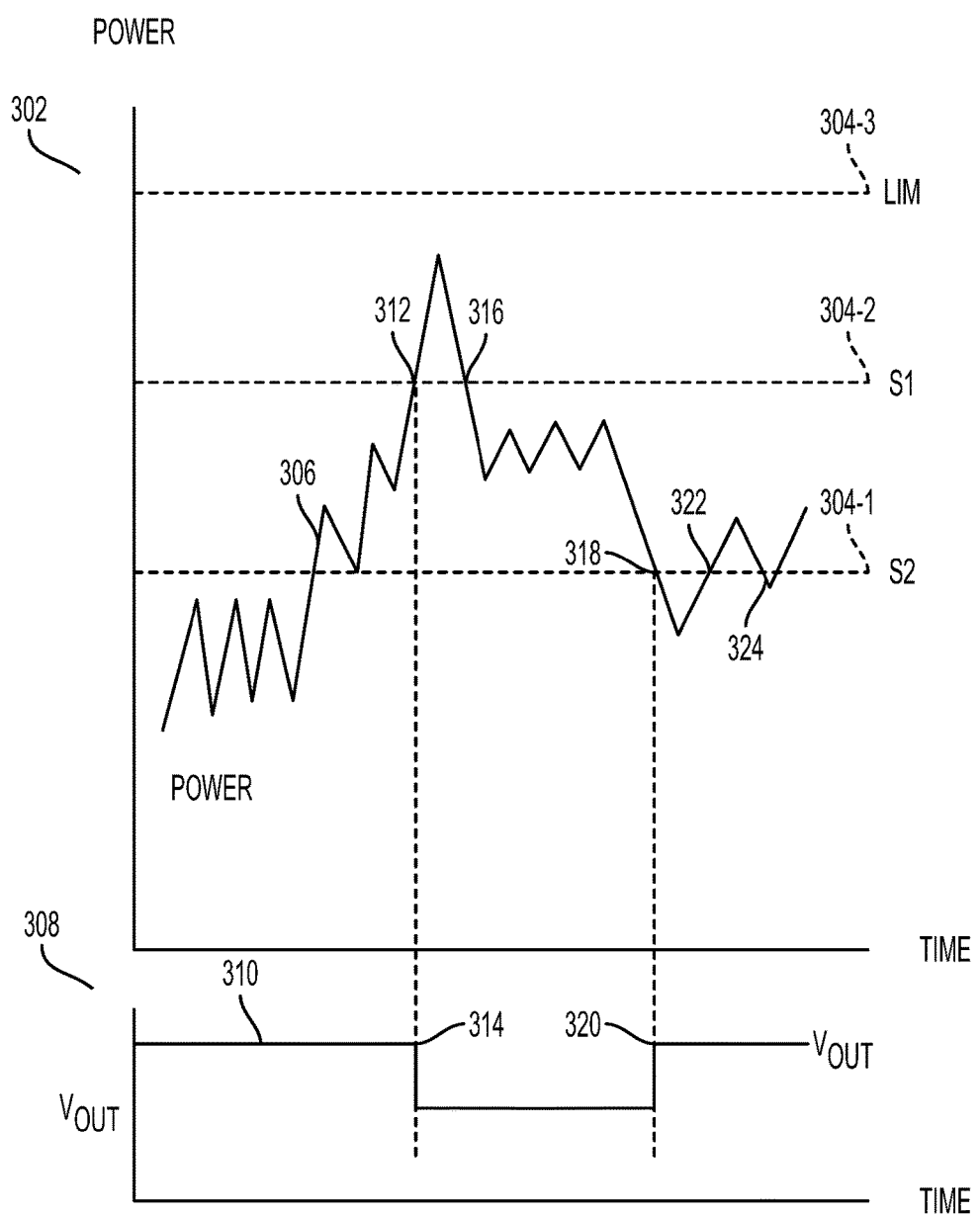
FIG. 3 depicts an example of a comparison by a sensor logic device according to one aspect of the disclosure.

FIG. 3 depicts an example of a comparison by the sensor logic device 110 according to one aspect of the disclosure. In a first graph 302, power versus (vs.) time is shown. Although power is described, it will be understood that power could be replaced by current or voltage. The three thresholds Lim, S1, and S2 are shown at 304-3, 304-2, and 304-1, respectively. The monitored power is shown by the plot 306. A second graph 308 shows the output voltage $V_{OUT}$ for the regulator 104. A line 310 shows the value of the output voltage $V_{OUT}$.

The monitored power represented by the plot 306 may start increasing to a point shown at 312 where the threshold S1 is met. In this case, the power begins at a point lower than the threshold S1 and then meets the threshold S1. In one aspect, either meeting the threshold S1 or going above the threshold S1 may be specified. However, when meeting the threshold S1 is described, this will cover both situations. When the threshold S1 is met, as described above, comparator 206-1 may output a signal to the $V_{OUT}$ control logic device 112 to reduce the output voltage of the regulator 104. As shown at 314, the output voltage $V_{OUT}$ is then reduced by an increment, for example, 32 mV. This corresponds to the power crossing the threshold S1.

At time 316, the power has dipped below the threshold S1. However, the output voltage $V_{OUT}$ is not increased when this occurs. In this case, the output voltage is not increased until the second threshold S2 is met. By not increasing the output voltage, hysteresis may be built in so that the output voltage may not be increased and decreased and increased again multiple times when the power varies within a small range. However, in some aspects, the input voltage may increase when the power dips below the first threshold S1.

As shown in the first graph 302, the power from time 316 may decrease and eventually meet threshold S2 at time 318. Meeting threshold S2 may mean equal to threshold S2 or dipping below threshold S2. When this occurs, the output voltage $V_{OUT}$ of the regulator 104 is increased. This is shown at time 320 in the second graph 308.

The power may then increase and go above threshold S2 at time 322. The power may decrease again and meet threshold S2 at time 324. However, the output voltage of the regulator 104 is already at the maximum output voltage target and thus is not increased again.

Figure 4:
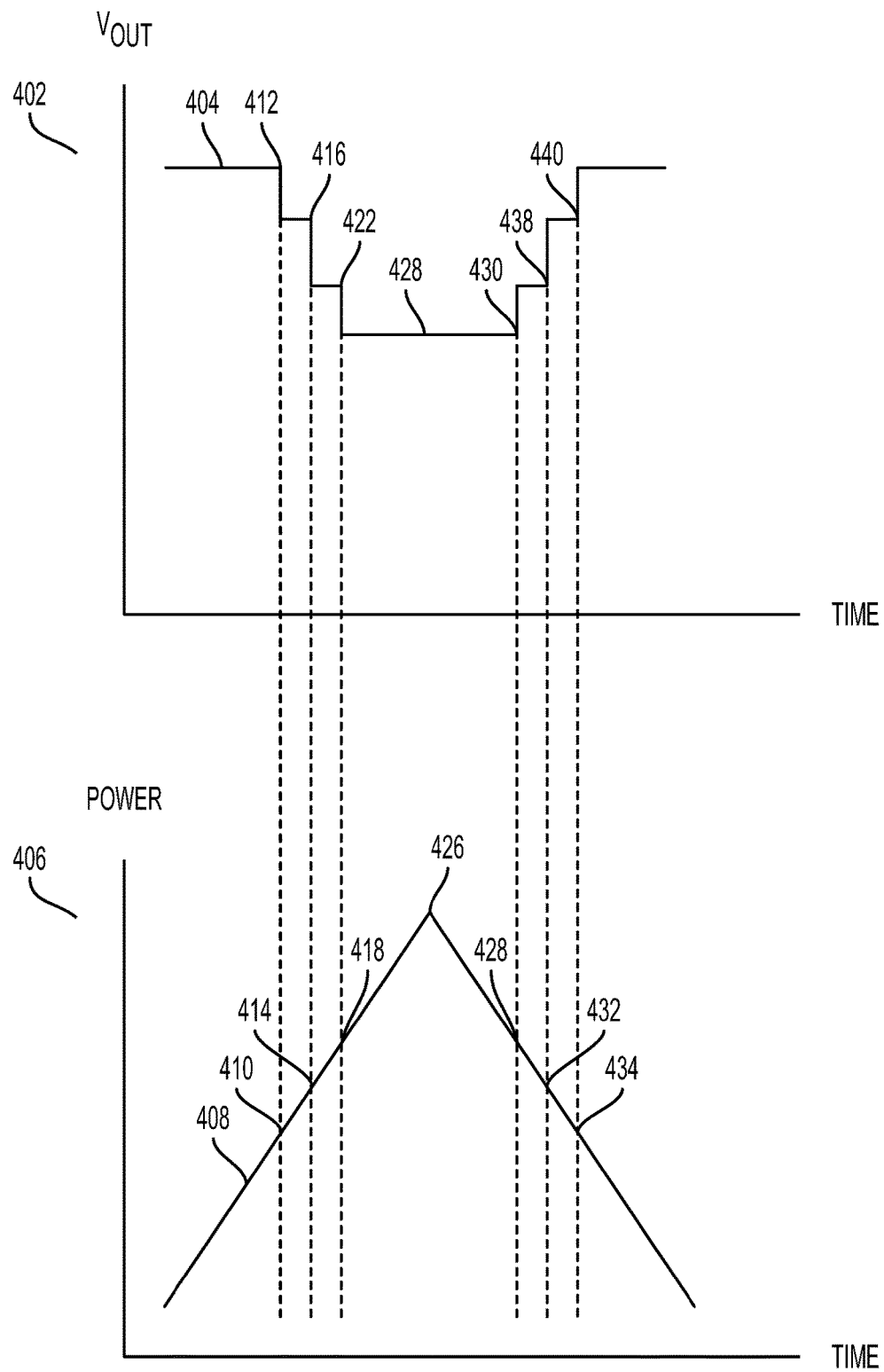
FIG. 4 shows example of an output voltage and power over time according to one aspect of the disclosure.

The above example showed a simple example of increasing and decreasing the output voltage. In operation, the output voltage $V_{OUT}$ of the regulator 104 may be increased and decreased multiple times. FIG. 4 shows an example of an output voltage $V_{OUT}$ and power over time according to one aspect. In a graph 402, the output voltage $V_{OUT}$ is shown at 404. Also, in a graph 406, the power 408 is shown over time.

At a time 410, the monitored power has increased above threshold S1. Then, at 412, the output voltage is lowered by an increment. At 414, the power may be still above threshold S1 and the output voltage is again lowered at 416. In one aspect, every clock cycle, the sensor logic device 110 may check whether the power is above the threshold or has met the threshold S1. In other aspects, the power drops below the threshold again and then meets the threshold again for the output voltage to be lowered again. Continuing, at time 418, the power is above the threshold S1 and at time 422, the output voltage of the regulator 104 is lowered again. The scenario may occur where a subsystem is performing some task and the load current is constantly increasing, which causes the current through an inductor of the regulator 104 to constantly increase. This causes the monitored power to dip below threshold S1 every time the output voltage $V_{OUT}$ is lowered, but then increases above the threshold S1 as the current continues to increase.

At some point, the subsystem may finish the task and the load current drops. At time 426, the monitored power starts to decline and the power does not meet the threshold S1. In this case, at 428, the output voltage is not increased or decreased. As discussed above, the output voltage $V_{OUT}$ of the regulator 104 is not increased until the power drops below the threshold S2. This may occur at time 428. Then, at 430, the output voltage is increased by an increment. This continues at times 432 and 434 as the output power goes above and then below the threshold S2. Thus, when checked at multiple clock cycles, the output power still meets the threshold S2. This corresponds to the times 438 and 440 where the output voltage is increased to a maximum level.

Even though the power, as shown at graph 406, is increasing while the output voltage is lowered and decreasing while the output voltage is increased, when the power is increasing, decreasing of the output voltage allows more input current to be provided to the regulator 104 and thus the regulator 104 can provide more output current to the subsystems 106. For example, the input power Pi to the regulator 104 is equal to the output power Po of the regulator 104 with the efficiency (eff) of the regulator applied. In other words, $P_i = P_o$. Also, with losses power may be equal to $P_i * eff = P_o = V_i * I_i * eff = V_o * I_o$, wherein eff is 0 to 1. That is, the input voltage times the input current is equal to some efficiency of the regulator 104 times the output voltage and the output current. Thus, when the output voltage $V_{OUT}$ is lowered, this lowers the input power specified. If the input current is increasing and the input voltage stays the same, the available power is decreased. Lowering the output voltage of the regulator 104 thus provides more available power as the input voltage is also lowered allowing the increase in input current. Thus, in graph 406, as power is increasing, the output voltage $V_{OUT}$ is continually lowered to provide more available power to the regulator 104. Also, when the power monitored is lowered, the output voltage $V_{OUT}$ may be increased such that there is less available power.

In one example, the monitored power may be the input current to the regulator 104, which may be monitored through an inductor of the regulator 104. As the input current increases and input voltage stays the same, using the above formulae, the available power decreases. By lowering the output voltage $V_{OUT}$, the input voltage may be lowered, thus providing more available current to the regulator 104.

Use of Priority Levels

The priorities of the subsystems 106 may be used to determine the maximum and minimum output voltage levels for the regulator 104. For example, the maximum and minimum voltages may be determined dynamically based on the priorities of the subsystems 106 that are requesting a power supply voltage from the regulators 104.

Figure 5:
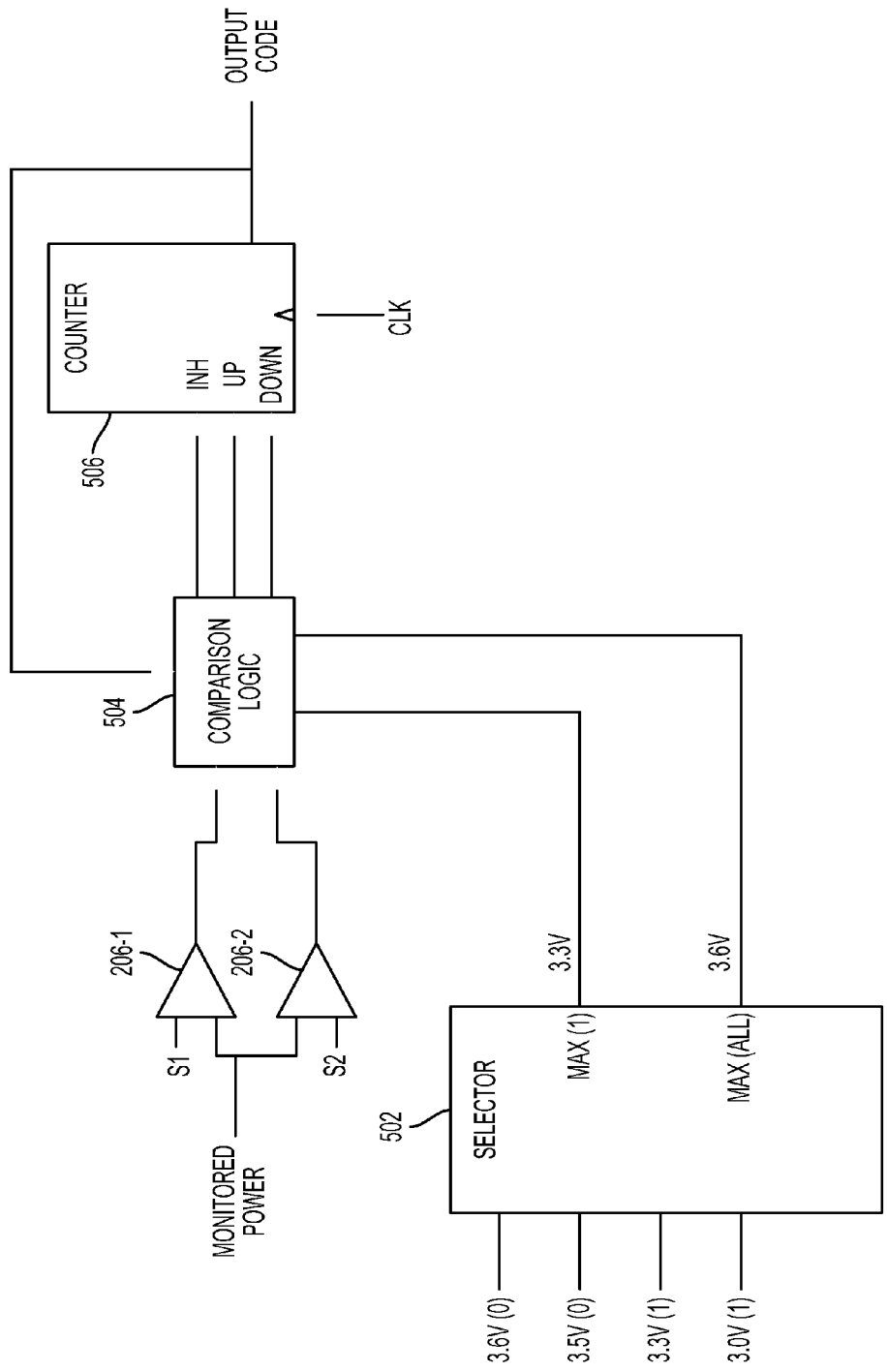
FIG. 5 depicts a system for using priorities to select maximum and minimum power supply voltage levels for the regulator according to one aspect of the disclosure.

FIG. 5 depicts a system for using priorities to select maximum and minimum power supply voltage levels for the regulator 104 according to one aspect. It is noted that components of the system may be implemented in digital or analog circuits, or via software. In one example, a selector 502 receives requests from the subsystems 106 for a power supply voltage, such as when the subsystems are operating. In other aspects, the inputs are based on all the subsystems that are present in the system and may use a power supply voltage. The selector 502 also receives power supply voltage operating specifications from the subsystems 106. For example, at this point in time, the power supply voltages of 3.6 V, 3.4 V, 3.3 V, and 3.0 V are the minimum operating voltages for the subsystems that are currently active. It should be noted that these requests may change over the operation of the electronic device. Different priorities may also be associated with the requested voltages. For example, 3.6 V and 3.4 V are associated with the subsystems 106 with a priority level of 0 and requested voltages 3.3 V and 3.0 V are associated with the subsystems 106 with a priority level of 1. As discussed above, the priority 0 subsystems are the subsystems in which a power supply voltage lower than the requested power supply voltage may be provided, where lower performance of that subsystem may be tolerated.

However, the priority 1 subsystems should have their requested power supply voltage request provided.

The selector 502 then determines the minimum and maximum power supply voltage levels according to the priorities and the minimum operating voltages. For example, the selector 502 takes a maximum of all of the priority 1 requests to determine the minimum power supply voltage. This determines the minimum amount of power supply voltage that is specified to supply the priority 1 devices, in this example, 3.3 V. Also, the selector 502 takes the maximum of all of the requested power supply voltages to determine the maximum power supply voltage. This is the highest minimum operating voltage that has been requested from all of the subsystems. In this example, a voltage of 3.6 V is selected for maximum power supply voltage.

The output of the selector 502 provides the maximum power supply voltage and the minimum power supply voltage levels. A comparison logic device 504 uses this information to determine whether the output voltage has hit the maximum power supply voltage or minimum power supply voltage levels. For example, comparators 206-1 and 206-2 receive the monitored power as discussed above from the sensor 204, and compare the power to the thresholds S1 and S2. Comparators 206-1 and 206-2 output a signal to the comparison logic device 504 based on the comparison. If the output voltage has reached the maximum of the priority 1 minimum operating voltages that are requested, then the output voltage cannot be lowered any more, and thus an inhibit (inh) signal is output. Also, if the output voltage has reached the maximum of all the minimum operating voltages that are requested, then the output voltage cannot be increased any more, and thus an inhibit signal is output. If the maximum or minimum output voltage level has not been reached, then the comparison logic device 504 increases or decreases the output voltage depending on what threshold is met.

When the comparison logic device 504 determines that the output voltage should be increased, the comparison logic device 504 outputs an up signal to a counter 506. The counter 506 increases when this occurs. The counter 506 may then output a signal with an output code that increases the output voltage. The counter value is then provided back to the comparison logic device 504 such that comparison logic device 504 can keep track of how many increases of the output voltage occur to determine whether the output voltage can be increased again. When the comparison logic device 504 determines that the output voltage should be decreased, the comparison logic device 504 outputs a down signal to the counter 506. The counter 506 decrements when this occurs. The counter 506 may then output a signal with an output code that decreases the output voltage. The counter value is then provided back to comparison logic device 504 such that comparison logic device 504 can keep track of how many decreases of the output voltage occur to determine whether the output voltage can be decreased again.

When an output voltage limit is reached, then the comparison logic device 504 outputs an inhibit signal. That is, when the minimum voltage is reached, the comparison logic device 504 does not decrease the power supply voltage anymore. When the maximum voltage is reached, the comparison logic device 504 does not increase the power supply voltage anymore. The above process may be performed every clock cycle, CLK, to output the output code.

Power Supply Current Priority Based Auto De-Rating for Power Concurrency Management Conventionally, high power consumption client device drivers (e.g., white light emitting diode (LED) flash drivers) are supplied by a switch mode battery charger (SMBC) operating in reverse boost configuration. Although this arrangement takes advantage of the high current capability of the SMBC, the arrangement presents some drawbacks. For example, the flash drivers are implemented by high voltage devices due to their wide input voltage range for charger operation. Further, the reverse boost operation does not provide the flash drivers with an optimized voltage supply because the battery voltage can only be stepped up. To mitigate some of the drawbacks, a dedicated buck-or-boost converter may be incorporated for power supply. Although the dedicated buck-or-boost converter cannot provide an optimized supply voltage for the flash device or drivers, an extra dedicated buck-or-boost converter is introduced in this configuration. The main disadvantage is that additional area is consumed to accommodate the dedicated buck-or-boost converter. Further, the dedicated buck-or-boost converter stays idle for most of the life of the product. Accordingly, an improved power management apparatus for high power consumption client devices is desirable.

Aspects of the present disclosure are directed to power management of power consumption client devices powered by a voltage regulator or converter (e.g., a buck-or-boost switching regulator circuit) of a power management apparatus. The power management apparatus may be a power management integrated circuit (PMIC) and the power consumption client devices include a set of low power consumption client devices and a high power consumption client device. In one aspect, the low power consumption client devices have a high priority relative to the high power consumption client device. For example, the high power consumption client device is a low priority device while one or more of the low power consumption client devices are high priority devices.

The high power consumption client device may be a flash device, such as a white light emitting diode (LED) flash used for a camera. The high power consumption device can be any other device that consumes higher power relative to other client devices. A power grid of the power management apparatus couples the high power consumption client device and the low power consumption client devices to the buck-or-boost switching regulator. In operation, the power grid provides power to the high power consumption client device and the low power consumption client devices.

In one aspect of the disclosure, the PMIC includes load current mitigation features to prevent the power grid from collapsing by de-rating a drive current for the high power consumption client device. As described herein, de-rating is the operation of a device at less than its rated maximum capability in order to prolong its lifetime. For example, de-rating current to one of the power consumption client devices involves operating the power consumption client device at a current that is less than its rated maximum current capability. For example, the high power consumption client device may be de-rated when a current consumed by the high power consumption client device is above a predetermined high power device threshold. The current or power consumed by the high power consumption client device and the low power consumption client devices is based on a current (e.g., an average current) of an inductor used by the buck-or-boost switching regulator. The inductor may be a single inductor used for both the buck inductor during a buck mode of operation and as a boost inductor during a boost mode of operation. For example, the inductor may be coupled between buck transistors and boost transistors of the buck-or-boost switching regulator. In one aspect, current or power across the inductor may be monitored by the power management system or apparatus.

In some aspects, an indication is provided by the PMIC to the high power consumption client device to indicate whether additional power is available to the high power consumption client device. For example, the indication is provided when current consumed by the low power consumption client devices and the high power consumption device is below a first predetermined system threshold. In this case, the high power consumption client device may increase its consumption based on the indication from the PMIC.

In other aspects of the disclosure, however, the current supply to the high power consumption client device is adjusted by the PMIC based on a request from the high power consumption client device. For example, the current to the high power consumption client device is increased in response to the request from the high power consumption client device when the current consumed by the low power consumption client devices and the high power consumption client device is less than a second predetermined system threshold. However, when the current consumed by the low power consumption client devices and the high power consumption client device is approaching a current limit, the current consumed by the high power consumption client device is reduced. For example, a third predetermined system threshold may be implemented to prevent the current consumed by the low power consumption client devices and the high power consumption device from exceeding the current limit or from approaching the current limit.

In addition to adjusting the current consumed by the high power consumption client device, the PMIC adjusts the voltage to the high power consumption client device. For example, the PMIC adjusts a lowest voltage allocated to the low priority device (e.g., the high power consumption client device) by ensuring the lowest voltage is sufficient to satisfy the voltage specifications of each of the high priority client devices (e.g., the low power consumption client devices).

Some aspects of the present disclosure include a mode arbitration implementation. The voltage arbitration and mode arbitration may be implemented to accommodate various modes of operation. In one aspect of the disclosure, a mode arbitration circuit may be locally implemented in the power management integrated circuit (PMIC). In some aspects, the mode arbitration circuit or device may be integrated with the voltage arbitration device. In other aspects, the mode arbitration device may be integrated with the regulator. The localized mode arbitration device may be configured to make determinations about where to set an output voltage of the grid and make determinations about mode selection. The mode arbitration device includes a localized voting device for making determinations for different modes of operations. The localized voting device receives voting signals that are enabled by one or more hardware control signals. Therefore, whenever a hardware control signal is high, the mode arbitration device takes into account predefined preference of where the output voltage should be set, the priority of a voting request and mode preference. For example, multiple clients (e.g., four clients) may vote to adjust the mode of operation of the voltage regulator.

The different modes of operation may include pulse frequency modulation (PFM) mode, pulse width modulation (PWM) mode, forced PWM (FPWM) mode, pass mode, auto mode etc. The different modes have different costs associated with them in terms of current consumption. Mode arbitration is performed with fixed priority order. A decreasing priority order may include FPWM mode, auto mode, forced pulse frequency modulation (FPFM) mode and pass mode. A request for a stronger mode of operation at any time during operation takes priority. A stronger mode of operation delivers a higher output current to the loads relative to a weaker mode of operation.

Figure 6:
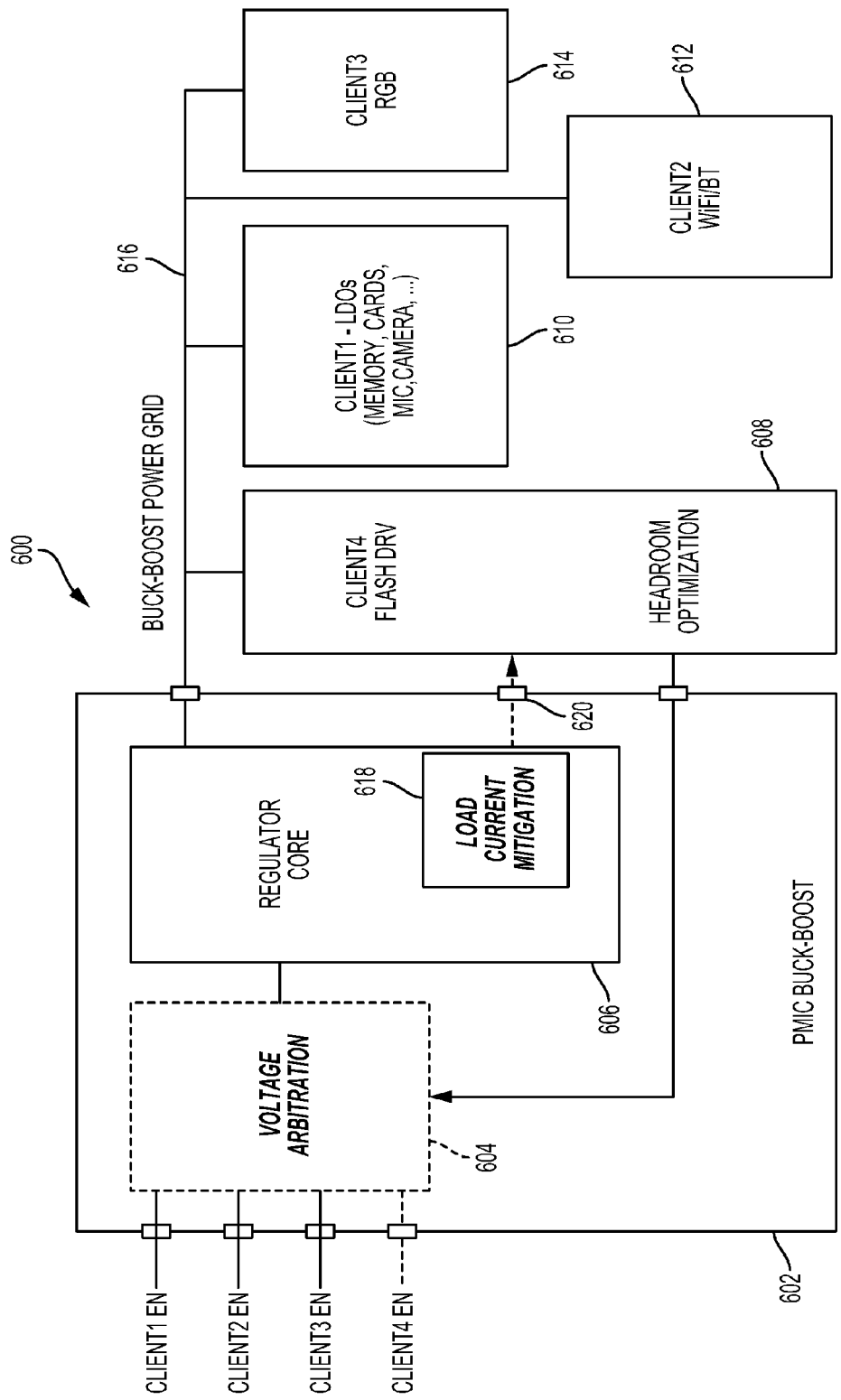
FIG. 6 depicts a power management system according to aspects of the present disclosure.

FIG. 6 depicts a power management system 600, according to aspects of the present disclosure. The power management system 600 includes a power management apparatus (e.g., a PMIC) 602, a high power consumption client device (e.g., flash device) 608, a first low power consumption client device (e.g., memory, microphone, camera) 610, a second low power consumption client device (e.g., Bluetooth/WiFi) 612, and a third low power consumption client device (e.g., red blue green (RGB) device) 614. All of the client devices have voltage specifications that change based on use cases. The memory may be a secure digital/universal flash storage or main memory storage. The power management apparatus 602 includes a voltage arbitration device 604 and a voltage regulator core 606, which includes a buck-or-boost switching regulator and a load current adjustment device 618. The load current adjustment device 618 may be integrated with the buck-or-boost switching regulator or external but coupled to the buck-or-boost switching regulator within the PMIC 602

A power grid 616 of the power management system 600 couples the high power consumption client device 608 and the low power consumption client devices 610, 612, and 614 to the power management apparatus 602. In one aspect of the disclosure, the load current adjustment device 618 provides the indication to the high power consumption client device 608 when a current consumed by the high power consumption client device 608 is above a predetermined threshold. The indication may be provided through a node 620. The indication may be a warning to the high power consumption client device that it is consuming an increased amount of current that may cause the power grid 616 to collapse. The warning indication may cause the high power consumption client device 608 to reduce the current consumed by the high power consumption client device 608 below the predetermined threshold.

For example, when the current consumed by the low power consumption client devices 610, 612, and 614 and the high power consumption client device 608 is below a system threshold, the load current adjustment device 618 indicates that extra power is available for use by the high power consumption client device 608 due to increased voltage headroom. This indication may cause the high power consumption client device 608 to increase current consumption. When the current consumed by the low power consumption client devices 610, 612, and 614 and the high power consumption client device 608 is approaching a current limit (e.g., 4.5 Amperes), however, the load current adjustment device 618 provides the indication to the high power consumption client device 608 to cause the high power consumption client device 608 to reduce its consumption of current. In this case, the current adjustment device 618 compares an overall current consumed by the high power consumption client device 608 and the low power consumption client devices 610, 612, and 614 to the current limit to prevent the collapse of the power grid 616.

The PMIC 602 prevents the current consumed by the one or more low power consumption client devices 610, 612, and 614 and the high power consumption client device 608 from exceeding the current limit. For example, if the current consumed by the low power consumption client devices 610, 612, and 614 and the high power consumption client device 608 may cause the power grid 616 to collapse, the current adjustment device 618 of the PMIC 602 does not send a warning indication to the high power consumption client device 608. Instead, the current adjustment device 618 may reduce current available to the one or more low power consumption client devices 610, 612, and 614 and/or the high power consumption client device 608 by stepping down the buck-or-boost switching regulator. The reduction may be based on a priority determination. For example, the high power consumption client device 608 may have a low priority and therefore the current consumed by the high power consumption client device 608 may be reduced.

In some aspects, the voltage arbitration/adjustment device 604 receives an indication from the high power consumption client device 608 to cause the voltage arbitration device 604 to adjust a voltage allocated to the high power consumption client device 608. The adjustment is based on whether a predetermined minimum voltage to operate each of the one or more low power consumption client devices 610, 612, and 614 is satisfied. For example, the voltage arbitration device 604 increases a voltage available to the high power consumption client device 608 when the predetermined minimum voltage to operate each of the one or more low power consumption client devices 610, 612, and 614 is satisfied. For example, the buck-or-boost switching regulator circuit may step up to increase the available voltage. When the predefined minimum voltage to operate each of the one or more low power consumption client devices 610, 612, and 614 is not satisfied, however, the voltage arbitration device 604 prevents an increase to the voltage allocated to the high power consumption client device 608 or reduces the voltage available to the high power consumption client device 608.

Figure 7:
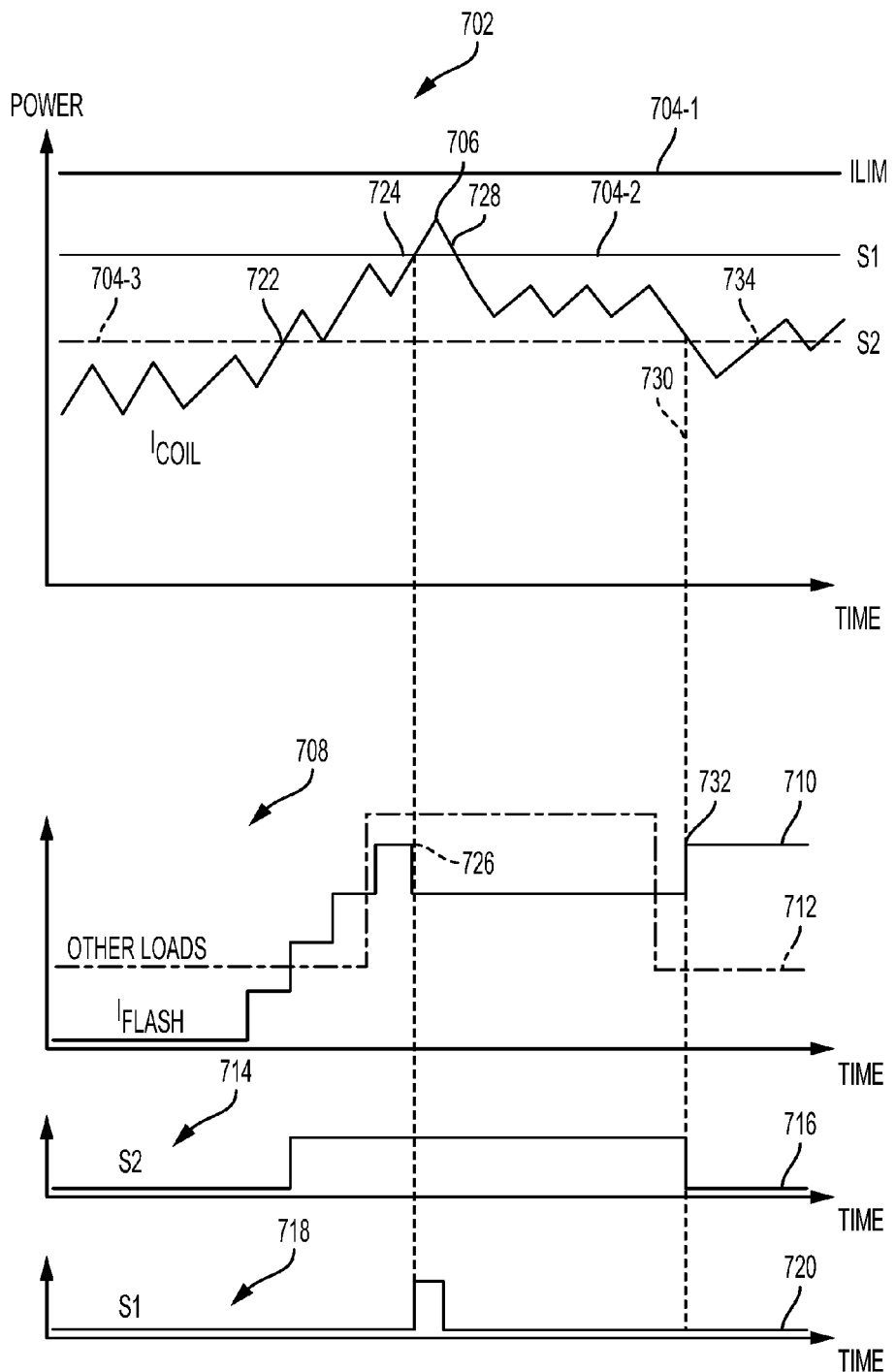
FIG. 7 depicts an example of a comparison by a power management integrated circuit according to one aspect of the disclosure.

FIG. 7 depicts an example of the comparison by the power management integrated circuit, according to one aspect of the disclosure. In this aspect, the comparison may be performed by the load current adjustment device. In a first graph 702, power vs. time is shown. Although power is described, it will be understood that power could be replaced by current or voltage. The buck-or-boost (BoB) architecture includes three levels of current limit: third threshold, ILIM, first threshold, S1, and a second threshold, S2. These levels are provided to signal the power management system of a loading state of the voltage regulator rail or grid. ILIM is the peak current limit, and thus if hit, the rail is in an imminent danger of going out of regulation. The S1 threshold signals that the loading is too high and mitigation responses should be initiated. S2 is the lowest threshold and when clear, signals that there is headroom to increase loading. S1 and S2 form a hysteresis window where S1 is the assertion and S2 is the de-assertion boundary for mitigation.

The three thresholds ILIM, S1, and S2 are shown at 704-1, 704-2, and 704-3, respectively. The monitored power of the overall load, including the high power consumption client device and the low power consumption client devices, is shown at 706. In a second graph 708, current vs. time is shown. A monitored current, IFLASH, of the high power consumption client device and a monitored current, Iotherloads, of the low power consumption client devices are shown as lines 710 and 712, respectively.

In a third graph 714, monitored current (at coil) of the overall load including the high power consumption client device and the low power consumption client devices relative to the threshold S2 vs. time is shown. A line 716 shows the monitored current of the overall load relative to the threshold S2. For example, the line 716 shows when the monitored current of the overall load is above or below the threshold S2. In a fourth graph 718, monitored current of the overall load relative to the threshold S1 vs. time is shown. A line 720 shows the monitored current of the overall load relative to the threshold S1. For example, the line shows when the monitored current of the overall load is above or below the threshold S1. Although, the thresholds in the graph 702 are shown in terms of current, the thresholds can also be shown in terms of power corresponding to the respective current values.

Referring to the graph 702, the current over time may start increasing to a point shown at 722 where the threshold S2 is met. The points discussed herein, may be points in time (e.g., point 722). In this case, the current begins at a point lower than the threshold S2 and then meets the threshold S2 at point 722. In one aspect, either meeting the value of threshold S2 or going above the threshold S2 may be specified. However, when meeting the threshold S2 is described, this will cover both situations. When the threshold S2 is met, as described above, the current adjustment device may output an indication for adjusting current consumption at the one or more loads on the power grid or for instructing one or more loads of the current status of current consumption at the loads.

The power over time may start increasing to a point shown at 724 where the threshold S1 is met. In this case, the power begins at a point lower than the threshold S1 and then meets the threshold S1. When the threshold S1 is met, the current adjustment device may output an indication for adjusting current consumption at the one or more loads on the power grid. As shown in graph 708, the threshold Si is met when the sum of the current $I_{FLASH}$, indicated by line 710, of the flash driver and the current $I_{other-loads}$, indicated by the line 712, meets the threshold S1. When the threshold S1 is met, the current adjustment device may, for example, send an indication to the high power consumption client device to reduce current consumption or may cause the current consumption at the high power consumption client device to be reduced. As shown at time 726, the current consumption by the high power consumption client device is then reduced by an increment or step. This corresponds to the power crossing the threshold S1.

At time 728, the power has dropped below the threshold S1. However, the power or current allocated to the high power consumption client device is not increased when this occurs. In this case, the current allocated is not increased until the second threshold S2 is met. By not increasing the allocated current, hysteresis may be built in so that the allocated current may not be increased and decreased and increased again multiple times when the power varies within a small range. However, in some aspects, the allocated current may be increased when the power drops below the first threshold S1.

As shown in the first graph 702, the power from time 728 may decrease and eventually meet threshold S2 at time 730. Meeting threshold S2 may mean equal to threshold S2 or dropping below threshold S2. When this occurs, the allocated current to the high power consumption client device is increased, as shown at time 732 of the graph 708. The power may then increase above threshold S2 at time 734.

Figure 8:
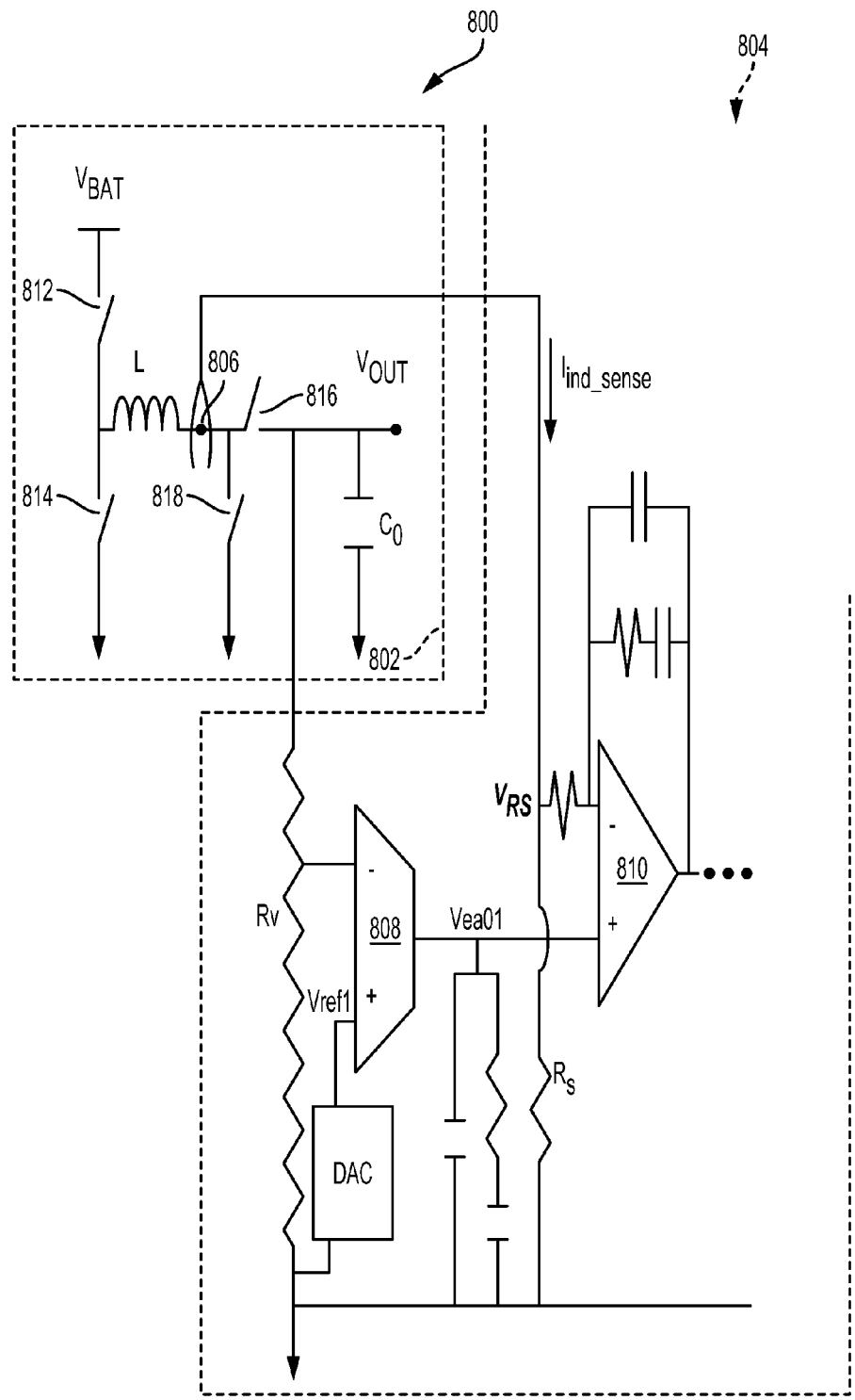
FIG. 8 illustrates an exemplary schematic of a buck-or-boost converter wherein current flow is sensed and fed back to the control loop of the buck-or-boost converter.

FIG. 8 illustrates an exemplary schematic of a buck-or-boost converter 800 where current flow is sensed in the power stage 802 of the buck-or-boost converter 800 and fed back to the analog control loop 804 of the buck-or-boost converter 800. The buck or boost converter 800 includes transistors 812, 814, 816 and 818. The transistor 812 is a high side buck transistor and the transistor 814 is a low side buck transistor. The transistor 816 is a high side boost transistor and the transistor 818 is a low side boost transistor. The buck-or-boost converter 804 may also include an inductor L coupled to the high side buck transistor 812, the high side boost transistor 816, the low side buck transistor 814 and the low side boost transistor 818. The control loop 804 generates control signals to control the transistors 812, 814, 816 and 818 and to ultimately adjust the current allocated to the load in conjunction with the current adjustment device.

A voltage sensing implementation, such as a voltage divider, including a variable resistor Rv senses an output voltage $V_{OUT}$ of the buck-or-boost converter 800 that is provided to the load. The voltage sensing implementation generates a voltage Vfb. An amplifier 808 subtracts Vfb from a reference voltage Vref1 to generate an amplified output of an error signal Vea01. The error signal Vea01 is compared to a current converted to voltage Vrs by an amplifier 810. The signal Vrs is based on current sensed at the inductor L. The current sensed at the inductor L may be converted to voltage (e.g., Vrs) by a current to voltage converter (I to V) 1288. For example, the amplifier 810 receives the signal Vrs and the error signal Vea01, and accordingly produces another error signal Vea2 that will be compared to the buck-or-boost ramps, generating PWM signals on which control of the transistors 812, 814, 816 and 818 is based.

The current or power consumed by the high power consumption client device and the low power client devices is based on a current (e.g., an average current) of an inductor used by the buck-or-boost switching regulator. For example, to prevent the current at the loads from hitting the peak current limit ILIM and causing imminent danger, e.g., the grid going out of regulation, a peak current limit (ILIM) is introduced to directly observe or monitor a mirrored coil current (e.g., the current at the inductor L) for faster cycle by cycle response. The other current limits ILIM_S1, and ILIM_S2, however, may be monitored at either the inductor L or may be monitored by observing a filtered error amplifier Vea01 node.

Aspects of the present disclosure (e.g., the PMIC) take advantage of the system buck-or-boost configuration. For example, an already existing system buck-or-boost converter may be used to supply power to the high power consumption client device (e.g., flash driver). Thus, aspects of the present disclosure take existing buck-or-boost converter features including the fact that the existing buck-or-boost converter is already designed for high current to support the flash driver. Also, the existing buck-or-boost converter is already configured to provide optimum supply voltage to the flash driver. In addition, the existing buck-or-boost converter is already in operation to support other client devices and will not be idle for most of its life.

Aspects of the present disclosure achieve area reduction by creating an environment for the high power consumption client device to coexist with the other power grid loads (e.g., low power consumption client devices) that may already be crowded while avoiding crashing the power grid. For example, the flash device/driver supported by the PMIC can be implemented with low voltage rated devices to achieve area reduction. In addition, size reduction is achieved by avoiding the introduction of an additional voltage regulator to support the flash device that is idle for most of its life. In addition, the aspects of the present disclosure achieve power reduction. For example, the reduced power dissipation may be achieved in conjunction with the step-up/step-down capability of the buck-or-boost converter topology.

Figure 9:
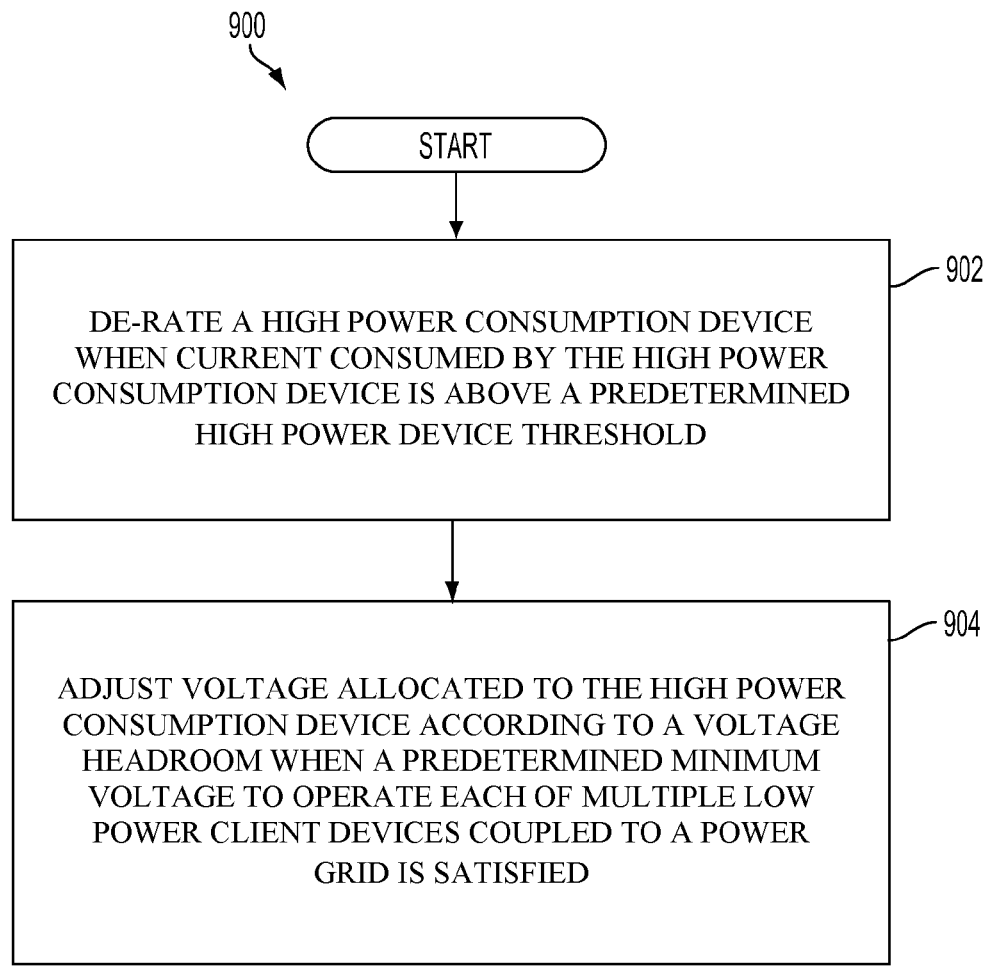
FIG. 9 depicts a simplified flowchart of a power management method according to one aspect of the disclosure.

FIG. 9 depicts a simplified flowchart of a power management method according to one aspect of the disclosure. At block 902, a high power consumption device is de-rated when a current consumed by the high power consumption device is above a predetermined high power device threshold. At block 904, a voltage allocated to the high power consumption device is adjusted according to a voltage headroom when a predetermined minimum voltage to operate each of multiple low power client devices coupled to a power grid is satisfied.

According to a further aspect of the present disclosure, a power management system is described. The power management system includes means for de-rating the high power consumption device when a current consumed by the high power consumption device is above a predetermined high power device threshold. The de-rating means may be the power management apparatus 602, the voltage regulator core, and/or the load current adjustment device 618. The power management system also includes means for adjusting a voltage allocated to the high power consumption device according to a voltage headroom when a predetermined minimum voltage to operate each of the multiple low power client devices coupled to the power grid is satisfied. The voltage adjusting means may be the power management apparatus 602, the voltage regulator core, and/or the voltage arbitration device 604. In another aspect, the aforementioned means may be any layer, module, or any apparatus configured to perform the functions recited by the aforementioned means.

Figure 10:
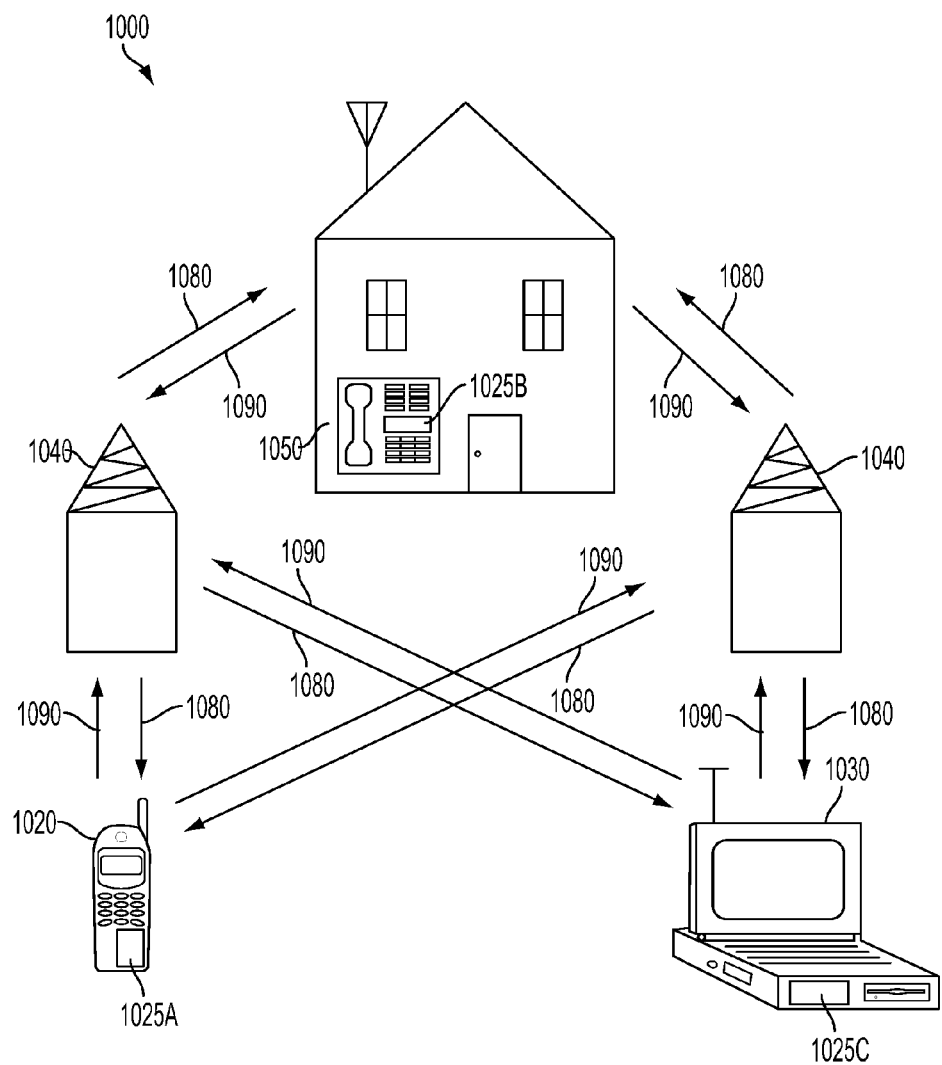
FIG. 10 is a block diagram showing an exemplary wireless communication system in which a configuration of the disclosure may be advantageously employed.

FIG. 10 is a block diagram showing an exemplary wireless communication system in which a configuration of the disclosure may be advantageously employed. For purposes of illustration, FIG. 10 shows three remote units 1020, 1030, and 1050 and two base stations 1040. It will be recognized that wireless communication systems may have many more remote units and base stations. Remote units 1020, 1030, and 1050 include IC devices 1025A, 1025C, and 1025B that include the disclosed power management system. It will be recognized that other devices may also include the disclosed power management system, such as the base stations, switching devices, and network equipment. FIG. 10 shows forward link signals 1080 from the base station 1040 to the remote units 1020, 1030, and 1050 and reverse link signals 1090 from the remote units 1020, 1030, and 1050 to base station 1040.

In FIG. 10, remote unit 1020 is shown as a mobile telephone, remote unit 1030 is shown as a portable computer, and remote unit 1050 is shown as a fixed location remote unit in a wireless local loop system. For example, a remote units may be a mobile phone, a hand-held personal communication systems (PCS) unit, a portable data unit such as a personal digital assistant (PDA), a GPS enabled device, a navigation device, a set top box, a music player, a video player, an entertainment unit, a fixed location data unit such as a meter reading equipment, or other communications device that stores or retrieve data or computer instructions, or combinations thereof. Although FIG. 10 illustrates remote units according to the aspects of the disclosure, the disclosure is not limited to these exemplary illustrated units. Aspects of the disclosure may be suitably employed in many devices, which include the disclosed power management system.

Non-Inverting Buck-or-Boost Automatic Pass-Through Mode for Power Management Integrated Circuits (PMICs)

The popularity of portable equipment (e.g., smartphones, portable computers, etc.) has driven technology and the desire for converting power efficiently. Direct current-direct current (DC-DC) converters called switching regulators (often referred to simply as "switchers") are especially suitable for use in portable electronic devices, and can either step-up (boost) or step-down (buck) DC electrical power. Switching regulators used in portable electronic devices include a class of switching converters called buck-or-boost (BoB) switching converters. The kind of buck-or-boost switchers used in portable electronic devices operate in buck mode and in boost mode. In buck mode, a voltage at an input port is bucked to produce a regulated voltage at an output port. In boost mode, a voltage at the input port is boosted to produce a regulated voltage at the output port. Thus, the output voltage of the buck-or-boost (BoB) switching converter is a constant voltage and the input voltage (e.g., from a voltage device such as a battery) can be above or below the output voltage. That is, the battery generating the input voltage $V_{IN}$ charges and discharges during operation.

Non-inverting buck-or-boost (BoB) architectures of the switching regulators or converters have been evolving towards better efficiency. For example, conventional four switch buck boost converters that have the 4 FETs (4-field effect transistors (FETs)) switching at each clock period have evolved to control loop (e.g., a single analog control loop circuit) that switches only two field effect transistors (2-FETs) at each cycle (e.g., buck-or-boost operation). A non-inverting buck-or-boost (BoB) converter includes a buck (step-down) converter combined with a boost (step-up) converter. Such a non-inverting buck-or-boost converter may use a single inductor which is used for both the buck inductor and the boost inductor.

Aspects of the present disclosure are directed to further improving the efficiency of the BoB architecture. In one aspect, the efficiency is improved by reducing an amount of switching of the BoB architecture. For example, when the input voltage (e.g., this input voltage may be referred to as $V_{IN\_equivalent}$) and the output voltage are equivalent (or approximately equal), switching of the high side FETs (or high side switches) is prevented (no-switching). For example, the high side switches are maintained in an ON state, which is equivalent to shorting the input voltage to the output voltage. In one configuration, a buck-or-boost switching regulator or buck-or-boost converter may include a high side buck transistor coupled to an input voltage node, a high side boost transistor coupled to an output voltage node, a low side buck transistor coupled to the high side buck transistor, and a low side boost transistor coupled to the high side boost transistor. The buck-or-boost converter may also include an inductor coupled to the high side buck transistor, the high side boost transistor, the low side buck transistor and the low side boost transistor. Additionally, the buck-or-boost converter includes a control loop (e.g., a single analog control loop).

The single analog control loop turns ON the high side buck transistor and the high side boost transistor and turns OFF the low side buck transistor and a low side boost transistor in accordance with a pass-through mode of operation. For example, the control loop provides one or more drive signals to the gates of the transistors to turn the transistors ON and OFF in accordance with the pass-through mode. Turning the transistors ON and OFF corresponds to closing and opening switches. For example, one or more of the drive signals from the single analog control loop circuit causes the high side buck transistor and the high side boost transistor to close or be turned ON. Similarly, another one or more of the drive signals from the single analog control loop circuit causes the low side buck transistor and the low side boost transistor to open or be turned OFF.

The turning ON of the high side transistors and the turning OFF of the low side transistors shorts the input voltage node to the output voltage node to prevent switching of the transistors when a voltage difference between the input voltage node and the output voltage node is small. The pass-through mode of operation occurs when the input voltage $V_{IN}$ is substantially equal to the output voltage $V_{OUT}$ of the BoB converter. The definition of "substantially equal" is given by the DC gain characteristic of the system of which the control loop is a constituent part, for example this voltage window can represent a threshold percentage (e.g., up to +/−1%) of output voltage of the regulator.

In some aspects of the disclosure, the single analog control loop circuit includes an amplifier (e.g., an error amplifier) to receive a feedback signal based on the voltage at the output voltage node (e.g., $V_{OUT}$) and to generate an error signal based on the voltage at the output voltage node relative to a reference voltage. The single analog control loop circuit also includes a comparator to compare the error signal with a boost voltage ramp signal and a buck voltage ramp signal. The comparator outputs a control signal to control switching of the buck-or-boost switching regulator circuit.

Figure 11A:
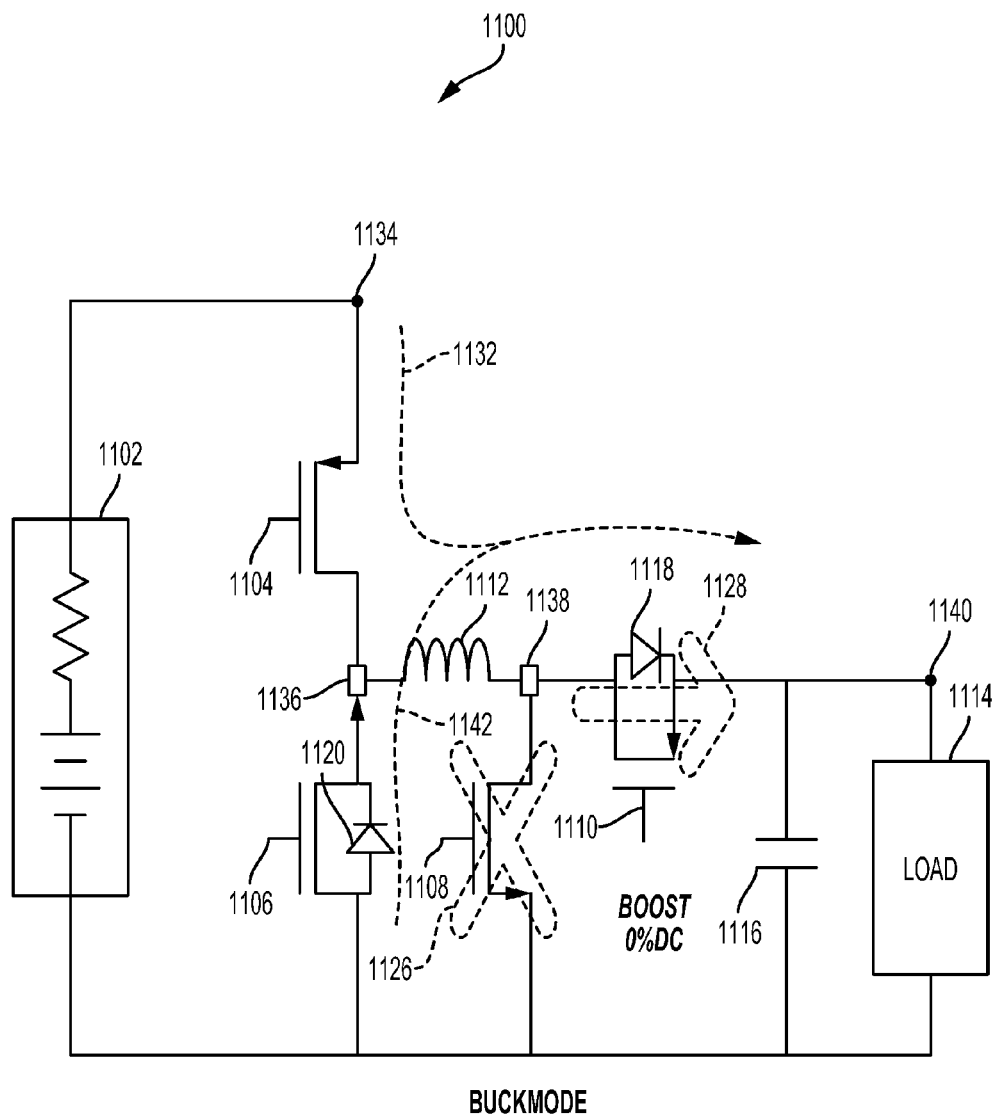
FIG. 11A is a schematic diagram of a buck-or-boost converter in accordance with a buck mode operation.
Figure 11B:
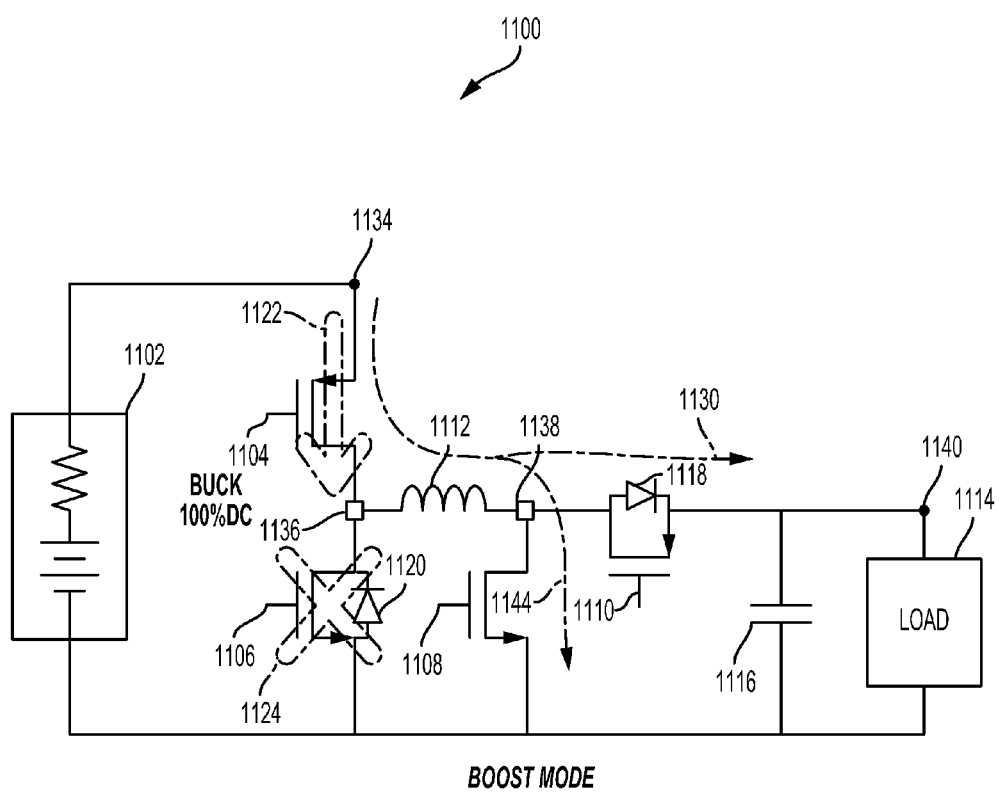
FIG. 11B is a schematic diagram of a buck-or-boost converter in accordance with a boost mode operation.
Figure 11C:
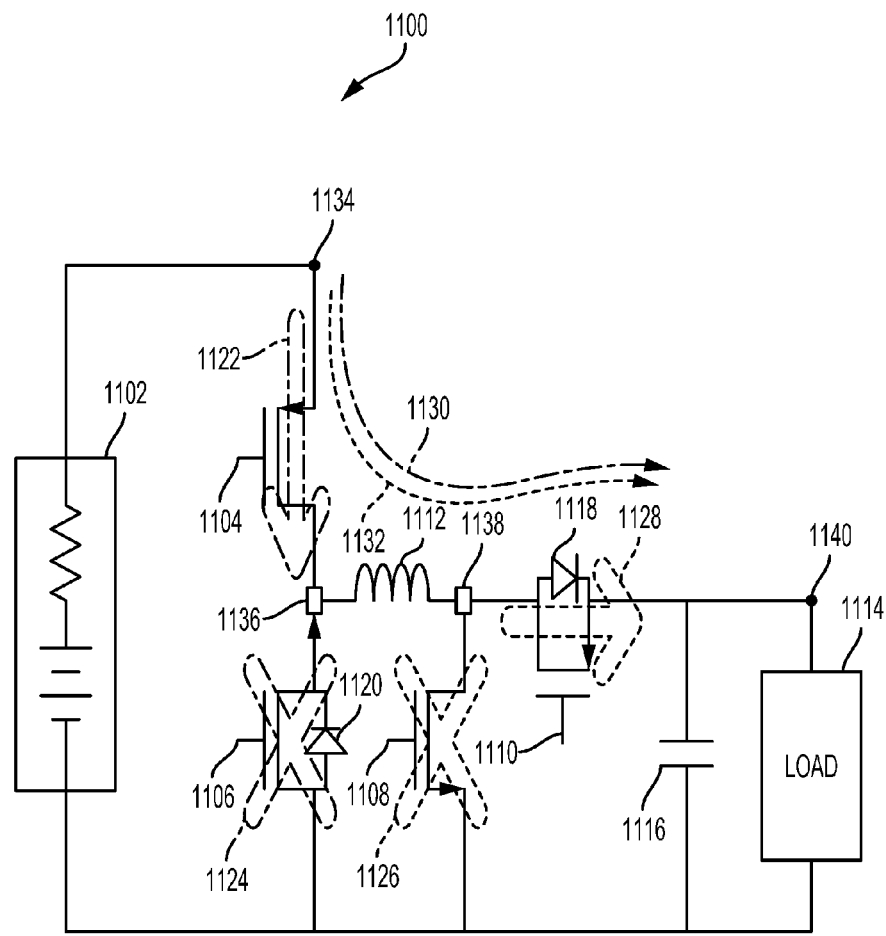
FIG. 11C is a schematic diagram of a buck-or-boost converter illustrating a pass mode operation in accordance with an aspect of the present disclosure.

Refer now to the drawings, and more particularly to FIGS. 11A-11C, which illustrate a schematic diagram of the power stage of a buck boost converter 1100 showing different modes of operations. In the buck mode of operation of FIG. 11A, the input voltage VIN is higher than the output voltage $V_{OUT}$. In the boost mode of operation of FIG. 11B, the output voltage $V_{OUT}$ is higher than the input voltage VIN. In the pass-through mode of operation of FIG. 11C, the input voltage VIN is substantially equal to the output voltage $V_{OUT}$. In some implementations, the buck boost converter 1100 may be used in a portable electronic device or user equipment (not shown) to provide a regulated power supply to system electronics via a system output $V_{OUT}$.

The buck boost converter 1100 includes an input voltage node 1134 into which the input voltage VIN is applied. The input voltage VIN may be supplied by a voltage supply device 1102 that is coupled to the input voltage node 1134. The buck boost converter 1100 also includes a high side buck transistor 1104 and a low side buck transistor 1106. The high side buck transistor 1104 may be a P-channel transistor having its source/drain path connected between the input voltage node 1134 and node 1136. The low side buck transistor 1106 may be an N-channel transistor having its drain/source path connected between node 1136 and ground. An inductor 1112 is connected between node 1136 and node 1138.

The buck boost converter 1100 also includes a high side boost transistor 1110 and a low side boost transistor 1108. The high side boost transistor 1110 may be a P-channel boost transistor that has its source/drain path connected between the output voltage node $V_{OUT}$ 1140 and node 1138. The low side boost transistor 1108 may be an N-channel transistor having its source/drain path connected between node 1138 and ground. As it is well understood by people skilled in the art the high side buck and boost transistors can be implemented also by N-channel transistors. Furthermore, all the switching transistors can be implemented by bipolar transistors or any other suitable controlled switching devices. An output capacitor 1116 is connected between the output voltage node 1140 and ground. An output load 1114 is connected in parallel with the capacitor 1116 between node 1140 and ground. Each of the high side buck transistor 1104, low side buck transistor 1106, high side boost transistor 1110 and low side boost transistor 1108 have their gates connected to feedback circuitry or the control loop (not shown). The control loop generates gate control signals via a set of outputs based on the output voltage $V_{OUT}$ applied from node 1140.

Referring to FIG. 11A, the buck boost converter 1100 operates in a buck mode, where an input voltage VIN is bucked to a lower voltage level and provided as a regulated voltage level at the output voltage or system output $V_{OUT}$. This is achieved by opening and closing one or more switches at a duty cycle. To achieve 100% duty cycle operation in a buck mode of operation, for example, a control loop (e.g., an analog control circuit/loop) modulates a switching frequency (Fsw) in order to achieve the desired duty cycle operation. The control loop is based on a feedback voltage, which is compared to a reference signal at an error amplifier (EA).

Very high duty cycle at the nominal Fsw (switching frequency) is limited by the minimum achievable low side pulse (or by a maximum duty cycle limit applied to the control loop) and are generally on the order of a few percent of a full period. To achieve very high duty cycle during operation, a control loop operates to modulate the switching frequency operation in sub-multiples of Fsw clock (e.g., Fsw/2, Fsw/3, . . . ) until the very high duty cycle is achieved. The 100% duty cycle is an extension of this operation, where no switching is observed.

For example, a control loop (not shown) is operated to produce drive signals to drive the high side buck transistor 1104 and the low side buck transistor 1106 to operate as a buck regulator. The drive signals may comprise pulse width modulated pulses that operate the high side buck transistor 1104 and the low side buck transistor 1106 so that high side buck transistor 1104 is ON when the low side buck transistor 1106 is OFF, and vice versa. For example, when the high side buck transistor 1104 is ON, current flows in the direction 1132. However, when the low side buck transistor 1106 is ON, current flows in the direction 1142. The high side boost transistor 1110 is maintained continuously ON to provide a path to the output voltage $V_{OUT}$, while the low side boost transistor 1108 is OFF.

Referring to FIG. 11B, the buck boost converter 1100 operates in a boost mode, where an input voltage VIN is boosted to a higher voltage level and provided as a regulated voltage level at the output voltage or system output $V_{OUT}$. Accordingly, the control loop (e.g., analog control circuit), may be operated to produce drive signals to drive the high side boost transistor 1110 and the low side boost transistor 1108 to operate as a boost regulator. The drive signals may comprise pulse width modulated pulses that operate the high side boost transistor 1110 and the low side boost transistor 1108 so that the high side boost transistor 1110 is ON when the low side boost transistor 1108 is OFF, and vice versa. For example, when the high side boost transistor 1110 is ON, current flows in the direction 1130. However, when the low side boost transistor 1108 is ON, current flows in the direction 1144. The high side buck transistor 1104 is maintained continuously ON to provide a path from the input voltage VIN, while the low side buck transistor 1106 is OFF. The boost mode operation is the counterpart of buck mode, and the pass-through from VIN to $V_{OUT}$ (high side transistors 1104 and 1110 ON) represents a 0% boost operation duty cycle. A very low duty cycle is achieved when the control loop modulates the Fsw operation in a similar fashion as explained above for buck operation. In this case, the 0% duty cycle represents the state when no switching event is observed.

Referring to FIG. 11C, the buck boost converter 1100 operates in a pass-through mode, when a voltage level $V_{OUT}$, at the node 1140, is substantially equal to the voltage level VIN, at the node 1134. In the pass-through mode the input voltage (VIN) is shorted to the output voltage ($V_{OUT}$) through the inductor 1112 in series with the two high side transistors (1104 and 1110). For example, to short the input voltage to the output the low side buck transistor 1106 and the low side boost transistor 1108 are turned OFF as respectively indicated by the crosses 1124 and 1126 while the high side buck transistor 1104 and the high side boost transistor 1110, are turned ON to allow current to flow in the directions 1122, 1128 and 1130. Pass-through mode operation occurs when the input voltage $V_{IN}$ and the output voltage $V_{OUT}$ are substantially equal where the control loop operates the buck transistors in 100% duty cycle and the boost transistors in 0% duty cycle. The transistors are maintained in this state as long as the output voltage $V_{OUT}$ is in regulation, no matter the value of the load current. For example, pass-through mode is achieved when the input voltage $V_{IN}$ minus the voltage drop caused by the path resistance (high side FETs+ inductor resistance) multiplied by the load current is equal to the output voltage $V_{OUT}$ ($V_{IN}$–Rpath*Iload=$V_{OUT}$).

Figure 12A:
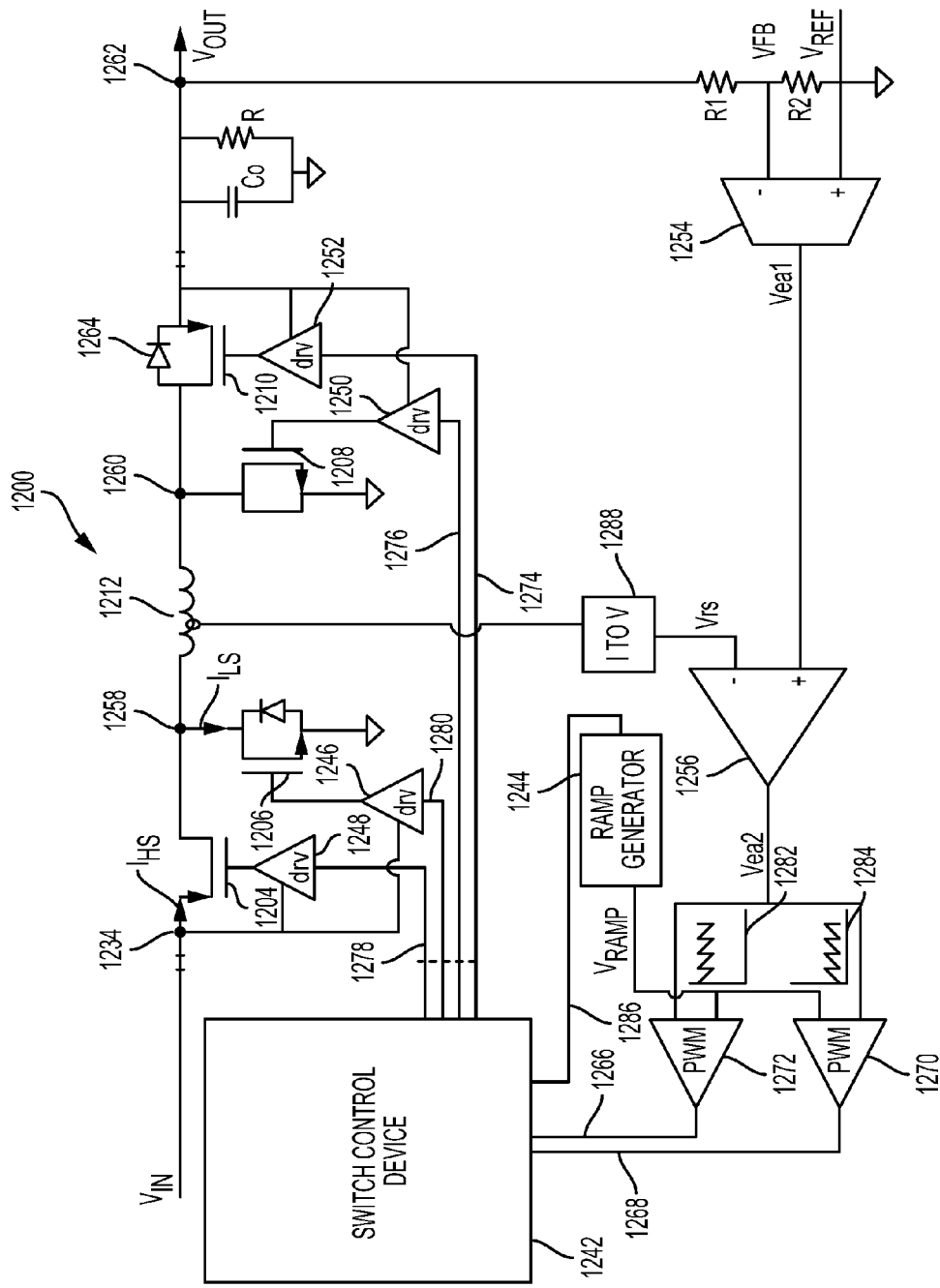
FIG. 12A is a schematic diagram of a buck-or-boost converter including the pulse width modulation (PWM) based analog control loop to achieve the pass-through mode in accordance with one or more aspects of the present disclosure.

FIG. 12A is a schematic diagram of a buck-or-boost converter 1200 including the pulse width modulation (PWM) based analog control loop to achieve the pass-through mode in accordance with one or more aspects of the present disclosure.

The buck-or-boost converter 1200 includes a high side buck transistor 1204 and a low side buck transistor 1206, a high side boost transistor 1210 and a low side boost transistor 1208, an inductor 1212, a capacitor Co, and a load illustrated by R. The load may be one or more electronic circuits, such as an integrated circuit, for example. One terminal of the transistor 1204 receives input voltage $V_{IN}$ (e.g., at node 1234) and the other terminal of the transistor 1204 is coupled to switching node (e.g., 1258) having a voltage $V_{SW}$. One terminal of the transistor 1206 is coupled to the switching node 1258 and the other terminal of the transistor 1206 is coupled to a reference voltage (e.g., ground). One terminal of the transistor 1210 is coupled to the inductor 1212 at node 1260 and the other terminal of the transistor 1210 is coupled to an output node (e.g., 1262) having a voltage $V_{OUT}$. One terminal of the transistor 1208 is coupled to the node 1260 and the other terminal of the transistor 1208 is coupled to a reference voltage (e.g., ground). Drivers 1246 and 1248 turn the transistors 1204 and 1206 ON and OFF while drivers 1250 and 1252 turn the transistors 1208 and 1210 ON and OFF.

The transistors 1204, 1206, 1208 and 1210 act as switches to selectively couple nodes in the circuit together. While transistors 1204 and 1210 are P-channel transistors and transistors 1206 and 1208 are N-channel transistors in this example, it is to be understood that other switch structures and arrangements may be used. The example switching regulator architecture shown here is just one of many switching topologies that may use the techniques described herein.

To cause the buck-or-boost converter 1200 to operate in the pass-through mode, an analog control loop is coupled to the buck-or-boost converter 1200 to provide the drive signals for turning ON and turning OFF the transistors. The analog control loop includes a switch control device 1242, a ramp generator, 1244, a comparing device 1256 (e.g., a comparator) or second error amplifier, and a first error amplifier 1254. The analog control loop also includes a buck PWM comparator (BuA) 1270, and a boost PWM comparator (BoA) 1272. The pass-through mode implementation is applicable to an average-current-mode control, as well as a simple voltage-mode control, where the voltage Vea1 (of FIG. 12A) directly feeds one of the inputs of the PWM comparators of FIG. 12A.

For example, the high side buck transistor 1204, the low side buck transistor 1206, the high side boost transistor 1210 and the low side boost transistor 1208 are configured by the switch control device 1242 to alternately charge and discharge an inductor 1212. The inductor is coupled to the load R, and current from the inductor 1212 supports an output voltage $V_{OUT}$ at the load R. The current through the high side buck transistor 1204 is labeled IHS, and the current through the low side buck transistor 1206 is labeled ILS. The positive flow of current IHS is defined as flowing in the direction from a source of the high side buck transistor 1204 to a drain of the high side buck transistor 1204, as illustrated by the arrow in FIG. 12A.

The switch control device 1242 controls the transistors based on input signals 1266 and 1268 derived from $V_{OUT}$, e.g., according to the control loop implementation as further described. A voltage sensing implementation, such as a voltage divider including a first resistor R1 and a second resistor R2, senses the output voltage $V_{OUT}$ and generates a voltage Vfb. An amplifier 1254 subtracts Vfb from a reference voltage Vref to generate an amplified output of a first error signal Vea1. The first error signal Vea1 is compared to a signal Vrs (that represents the inductor current) by the current amplifier 1256 and generates the second error signal Vea2. The ramp signal Vramp is generated by the ramp generator 1244. For example, the ramp generator 1244 produces the ramp signal Vramp having a period and the PWM comparators 1272 and 1270 receive the ramp signal Vramp and the second error signal Vea2 to generate the PWM signals 1266 and 1268, that in accordingly modulate the switching FETS 1204, 1206, 1210 and 1208.

In one aspect of the disclosure, the analog control loop may be implemented in accordance with pulse width modulation (PWM). The buck and the boost duty cycle are generated by two independent PWM comparators (e.g., buck 1270 and boost 1272). Each comparator is fed by its respective ramp (not shown), originated in the ramp generator 1244, in one of the input terminals and by the error signal Vea2 originated from the amplifier 1256, in the other input terminal.

Figure 13:
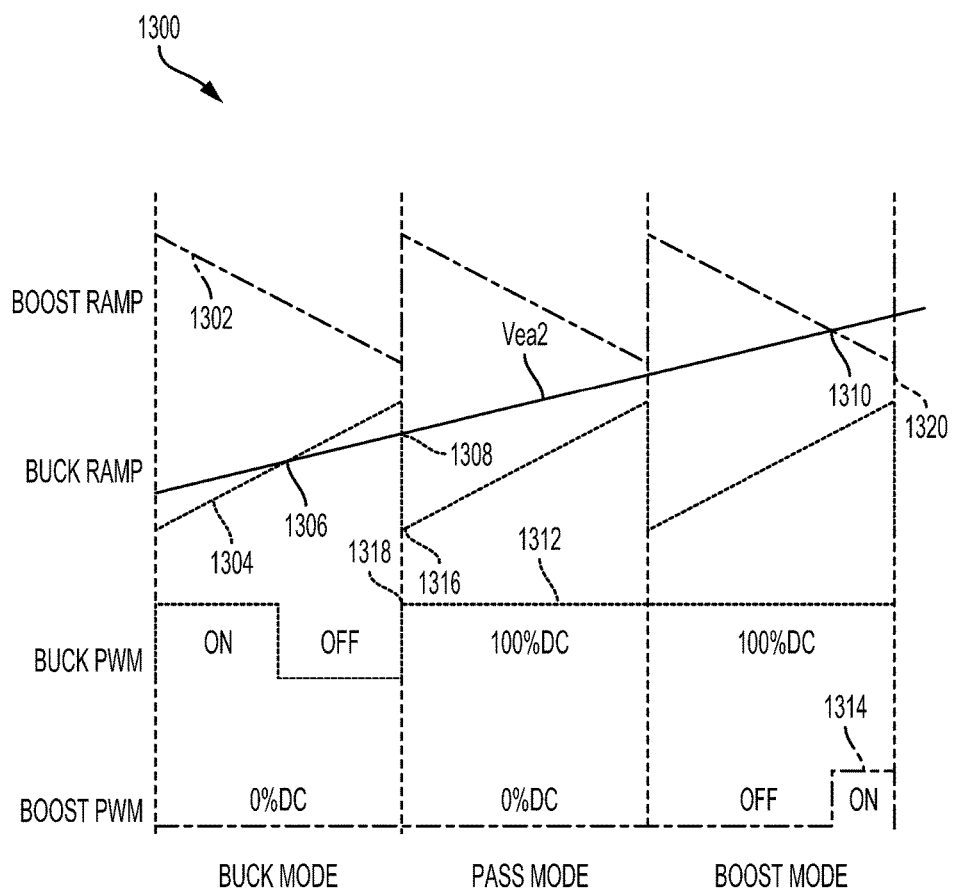
FIG. 13 illustrates a waveform of the buck-or-boost converter when the buck-or-boost converter transitions from a buck mode operation to pass-through mode operation to a boost mode operation.

FIG. 13 illustrates a waveform of the buck-or-boost converter when the buck-or-boost converter transitions from a buck mode operation to pass-through mode operation to a boost mode operation. For example, FIG. 13 includes a buck ramp 1304 and boost ramp 1302, alongside an error signal Vea2. The output voltage Vea2 from the second error amplifier transitions throughout the buck and boost ramp in order to generate a desirable buck or boost PWM signal to regulate the output voltage $V_{OUT}$. The buck and boost PWM signals control the switching of the high side buck transistor 1204, the low side buck transistor 1206, the high side boost transistor 1210 and the low side boost transistor 1208, of FIG. 12A.

For example, to achieve the pass-through mode of operation, 100% duty cycle buck operation and 0% duty cycle boost operation are simultaneously achieved. The control loop positions the error signal Vea2 above the buck ramp 1304 and simultaneously below the boost ramp 1302. For example, the positioning of the error signal Vea2 is achieved by establishing a gap window between the buck and the boost ramp, as seen in FIG. 13. In some implementations, 100% buck duty cycle and 0% boost duty cycle may be generated using only one ramp. In this case, the error signal Vea2 may be offset to obtain two signal vea2a and vea2b, but still using two PWM comparators and generating two distinct PWM signals (one for buck and one for boost).

To achieve the pass-through mode of operation, the switch control device 1242 controls the transistors 1204, 1206, 1208 and 1210 based on input signals 1266 and 1268 derived from $V_{OUT}$. The input signals 1266 and 1268 (also the output signals of the BoA 1272 and the BuA 1270, respectively) may be a pulse-width modulated (PWM) output signals corresponding to the boost PWM and the buck PWM, respectively. The boost PWM and buck PWM are provided to the switch control device 1242, which generates gate control voltages or control signals 1274, 1276, 1278 and 1280 to turn the transistors ON and OFF.

For example, the input signal 1268 may be used to control the high side buck transistor 1204 and the low side buck transistor 1206. Similarly, the input signal 1266 may be used to control the high side boost transistor 1210 and the low side boost transistor 1208. For example, the output voltage Vea2 is maintained within the gap such that an input boost ramp voltage 1282 of the boost PWM comparator BoA 1272 is higher than the output voltage Vea2 and an input buck ramp voltage 1284 of the buck PWM comparator BuA 1270 is below the output voltage Vea2. In some aspects of the disclosure, the input boost ramp voltage 1282 and the input buck ramp voltage 1284 may be generated by the ramp generator 1244 or a different ramp generator. For example, during every cycle, the switch control device 1242 may reset the value of the input buck ramp voltage 1284 back to zero or an offset value. To reset the ramps, the switch control device 1242 may generate a reset signal 1286 to the ramp generator 1244 or any other generator generating the ramp signals. Thus, in some implementations, the input boost ramp voltage 1282 and the input buck ramp voltage 1284 may be generated based on the sensed current IHS of the high side buck transistor 1204. For example, the current on the buck or boost high side FET can be sensed whether or not the converter is operating in a buck or boost mode. In other implementations, the ramp signals may be based on voltage or other parameters.

In operation, (e.g., when Vea2 is generated to fall within the gap or other instances), the output of the BoA 1272 (also the input signal 1266 to the switch control device 1242) causes the switch control device 1242 to generate control signals through the drivers 1250 and 1252 to the gates of the high side boost transistor 1210 and the low side boost transistor 1208. In addition, the output of the-BuA 1270 (also the input signal 1268 to the switch control device 1242) causes the switch control device 1242 to generate control signals through the drivers 1246 and 1248 to the gates of the high side buck transistor 1204 and the low side buck transistor 1206.

For example, the control signal 1274 causes the high side boost transistor 1210 to be turned ON and the control signal 1276 causes the low side boost transistor 1208 to be turned OFF for the pass-through mode of operation. Similarly, the control signal 1278 causes the high side buck transistor 1204 to be turned ON and the control signal 1280 causes the low side buck transistor 1206 to be turned OFF for the pass-through mode of operation. The control implementation is illustrated in FIG. 13.

FIG. 13 illustrates a waveform 1300 of the buck-or-boost converter when the buck-or-boost converter transitions from a buck mode of operation to pass-through mode of operation to a boost mode of operation. The graph 1300 shows the error signal Vea2 across a range of voltage values over time. The graph 1300 also shows a boost ramp 1302 and a buck ramp 1304 across a range of voltage values over time. For example, the boost ramp 1302 corresponds to the input boost ramp voltage 1282 and the buck ramp corresponds to the input buck ramp voltage 1284 of FIG. 12A.

For illustrative purposes, the three operation modes are shown in three subsequent clock cycles. For example, the implementation of FIG. 13 illustrates a representation of the buck-or-boost operation when a battery voltage (input voltage of buck-or-boost) goes through a complete discharging cycle of operation. For example, the fully charged battery generates input voltage for the buck-or-boost that is higher than the output voltage. In this case the control loop error signal Vea2 (e.g., error voltage) and the buck and boost PWM signals behave like the buck mode illustration of FIG. 13. When the battery voltage and load current are such that the input voltage $V_{IN}$ is substantially equal to output voltage (e.g., this input voltage may be referred to as $V_{IN\_equivalent}$), the control loop operates in the pass-through mode. As the battery discharges with time, the input voltage $V_{IN}$ falls below the output voltage $V_{OUT}$ in accordance with a boost mode of operation as illustrated in FIG. 3. While the illustration corresponds to the discharging of the battery, a similar representation of the buck-or-boost operation may be achieved during input voltage $V_{IN}$ and/or output current transients.

The error signal Vea2 is initially higher than the buck ramp 1304 (e.g., up to point 1306). As the buck ramp 1304 gradually increases during the buck mode of operation, the buck ramp 1304 intersects the error signal Vea2 at various points. For example, the buck ramp 1304 crosses the error signal Vea2 at point 1306. At this point, the high side buck transistor 1204 is turned OFF in accordance with the duty cycle corresponding to the buck PWM 1312. When the buck ramp 1304 crosses the error signal Vea2, a duty cycle between 0% and 100% is established. This means that the $V_{IN}$ is no longer substantially equivalent to $V_{OUT}$. The switching control device 1242 then causes the buck ramp 1304 to reset to zero or an offset value at point 1316. The generation of the PWM signal renders the ramp unnecessary or unimportant until the next period is started. Each cycle period is created by the Fsw clock.

The buck ramp 1304 intersects the error signal Vea2 again when the buck ramp 1304 is reset. Accordingly, when the error signal Vea2 is less than the maximum value of the buck ramp 1304 and greater than a minimum value of Vramp (here, ground), the high side buck transistor 1204 is turned ON in accordance with the duty cycle corresponding to the buck PWM 1312. When the buck ramp 1304 is less than the error signal Vea2 (e.g., between points 1308 and 1310), the buck PWM 1312, transitions to high at point 1318.

As the error signal Vea2 gradually increases, the boost ramp 1302 intersects the error signal Vea2 at various points. For example, the boost ramp 1302 crosses the error signal Vea2 at point 1310. At this point, the high side boost transistor 1210 is turned OFF in accordance with the duty cycle corresponding to the boost PWM 1314. When the boost ramp 1302 crosses the error signal Vea2, a duty cycle between 0% and 100% is established. The switching control device 1242 then causes the boost ramp 1302 to reset at point 1320. Unlike conventional PWM control, the buck-or-boost implementation discussed in accordance with aspects of the present disclosure turns the boost high side transistor ON at the beginning of each Fsw cycle. For example, each cycle starts in the boost OFF-time (when the inductor current is delivered to the load). The boost PWM signal 1314 defines the time when boost high side is turned OFF and boost low side is turned ON. When boost low side is ON the inductor is charged and it lasts until the cycle expires.

The analog loop control of the buck-or-boost converter is based on the boost ramp 1302 and the buck ramp 1304. Every cycle (clock gated) starts in the pass-through equivalent mode of operation because whether the input voltage is higher or lower than the output voltage (and any value in between), each cycle starts with buck high side and boost high side transistors ON, until any of the PWM (buck or boost) signals assert or a next cycle starts. The pass-through mode of operation at the start of the cycle corresponds to an observation phase where the analog control loop tests the input voltage $V_{IN}$ and the output voltage $V_{OUT}$ levels. If $V_{IN}$ is greater than $V_{OUT}$ the inductor current increases and charges the output voltage $V_{OUT}$. The control loop then provides the error signal Vea2 to generate the buck PWM signal with a desirable or specified duty cycle. If $V_{IN}$ is less than $V_{OUT}$, the inductor current discharges and consequently discharges the output voltage $V_{OUT}$. The control loop generates a desirable or specified boost PWM duty cycle.

When the input voltage is substantially equal to the output voltage $V_{OUT}$ the inductor current charges or discharges. In this case, the control loop error signal Vea2 transitions to a desirable position in the gap between the buck and the boost ramps. To achieve a pass-through mode, the error signal Vea2 is maintained in a voltage window or gap between the boost ramp 1302 and a buck ramp 1304. For example, the error signal Vea2 is maintained between the points 1308 and 1310. In the pass-through mode, the switching regulator is conveniently positioned to transition to the boost mode of operation or the buck mode of operation when a transient occurs.

The pass-through mode applied to the buck-or-boost converter in accordance with a PWM mode of operation as described above can also be applied in accordance with a pulse frequency modulation (PFM) mode of operation. Although the PFM mode of operation is independent of the PWM control loop and the ramps, the end result (e.g., $V_{IN}$ short to $V_{OUT}$) is the same. The different control method of the PFM mode of operation uses building block circuits shown in FIG. 12B.

Figure 12B:
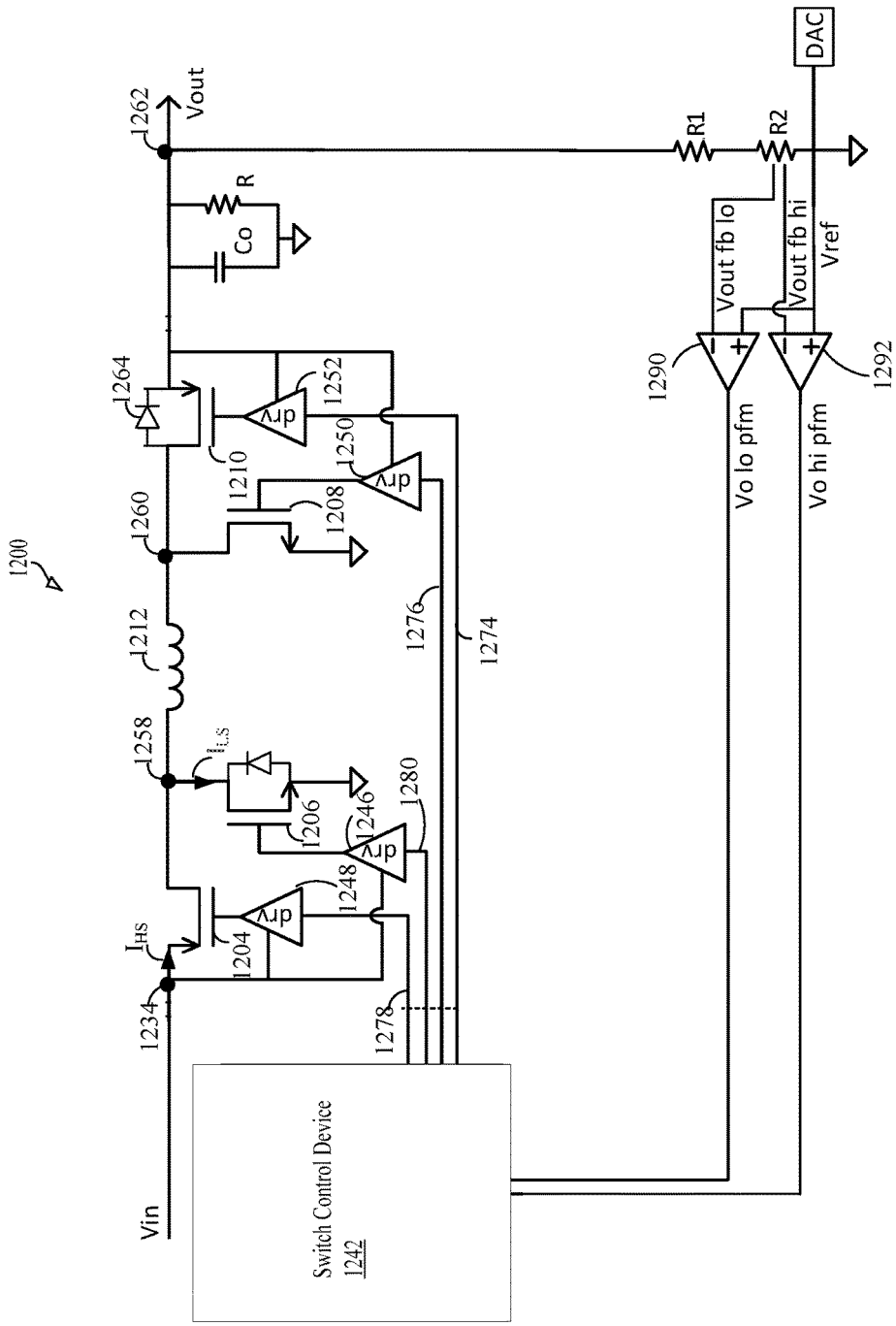
FIG. 12B is a schematic diagram of a buck-or-boost converter including the pulse frequency modulation (PFM) based analog control loop to achieve the pass-through mode in accordance with one or more aspects of the present disclosure.

FIG. 12B is a schematic diagram of a buck-or-boost converter including the pulse frequency modulation (PFM) based analog control loop to achieve the pass-through mode in accordance with one or more aspects of the present disclosure. For illustrative purposes, some of the labelling and numbering of the components and features of FIG. 12B are similar to those of FIG. 12A. FIG. 12B, however, does not include the boost PWM comparator (BoA) 1272, the buck PWM comparator (BuA) 1270, the ramp generator 1244, the current to voltage converter (I to V) 1288, the current amplifier 1256 and the first error amplifier 1254. Rather, FIG. 12 B includes a first comparator 1290, a second comparator 1292 and a digital to analog converter coupled to the second comparator 1292.

Avoiding switching when the input voltage $V_{IN}$ is substantially equal to the output voltage $V_{OUT}$ may also be applied to pulse frequency modulation (PFM) operation. Similar to PWM operation, in pass-through mode input is shorted to the output through the high side buck transistor 1204, the high side boost transistor 1210 and the inductor 1212 configured in the series connection. A switch control device 1242 (e.g., asynchronous state machine (ASM))

controls the power stage in order to regulate output voltage $V_{OUT}$ of the buck-or-boost converter into a window based on the first comparator 1290 and the second comparator 1292. For example, $V_{OUT}$ setting +2% (by comparator 1290 of FIG. 12B)<$V_{OUT}$<$V_{OUT}$ setting +4% (by comparator 1292 of FIG. 12B).

Three distinct phases are observed with the PFM implementation, an inductor energizing phase, an inductor de-energizing phase and a high impedance phase. In buck mode (e.g., $V_{IN}$>$V_{OUT}$), the inductor energizing phase is equivalent to the pass-through mode. In the inductor energizing phase, as long as the load current can be supplied and the output voltage $V_{OUT}$ stays in the regulation window and no current limit is reached, the ASM maintains the status quo until one of the conditions is not satisfied. If the current limit is reached or the output voltage $V_{OUT}$ goes above the regulation window (given by comparator 1292), the ASM configures the transistors to discharge inductor current through the buck low side transistor 1206 and the boost high side transistor 1210 from ground to the output voltage $V_{OUT}$.

When inductor current reaches a low value (e.g., zero), the high impedance phase is initiated in which all of the four transistors are off. If the output voltage $V_{OUT}$ discharges below the lower limit of the regulation window (given by comparator 1292), the cycle starts again. In the boost mode (e.g., $V_{IN}$<$V_{OUT}$), the energizing phase is accomplished by turning ON the buck high side transistor 1204 and the boost low side transistor 1208 until the current limit is reached. Then, the inductor de-energizing phase that is equivalent to the pass-through mode starts. In the inductor de-energizing phase, the two high side transistors are in an ON state. In this phase, as long as the load current can be supplied and the output voltage $V_{OUT}$ stays in the regulation window, the ASM maintains the status quo until one of the conditions is not satisfied. If the inductor current is completely discharged, the high impedance phase is started and, again, the cycle re-starts when the output voltage $V_{OUT}$ discharges below the lower limit of the regulation window.

Figure 14:
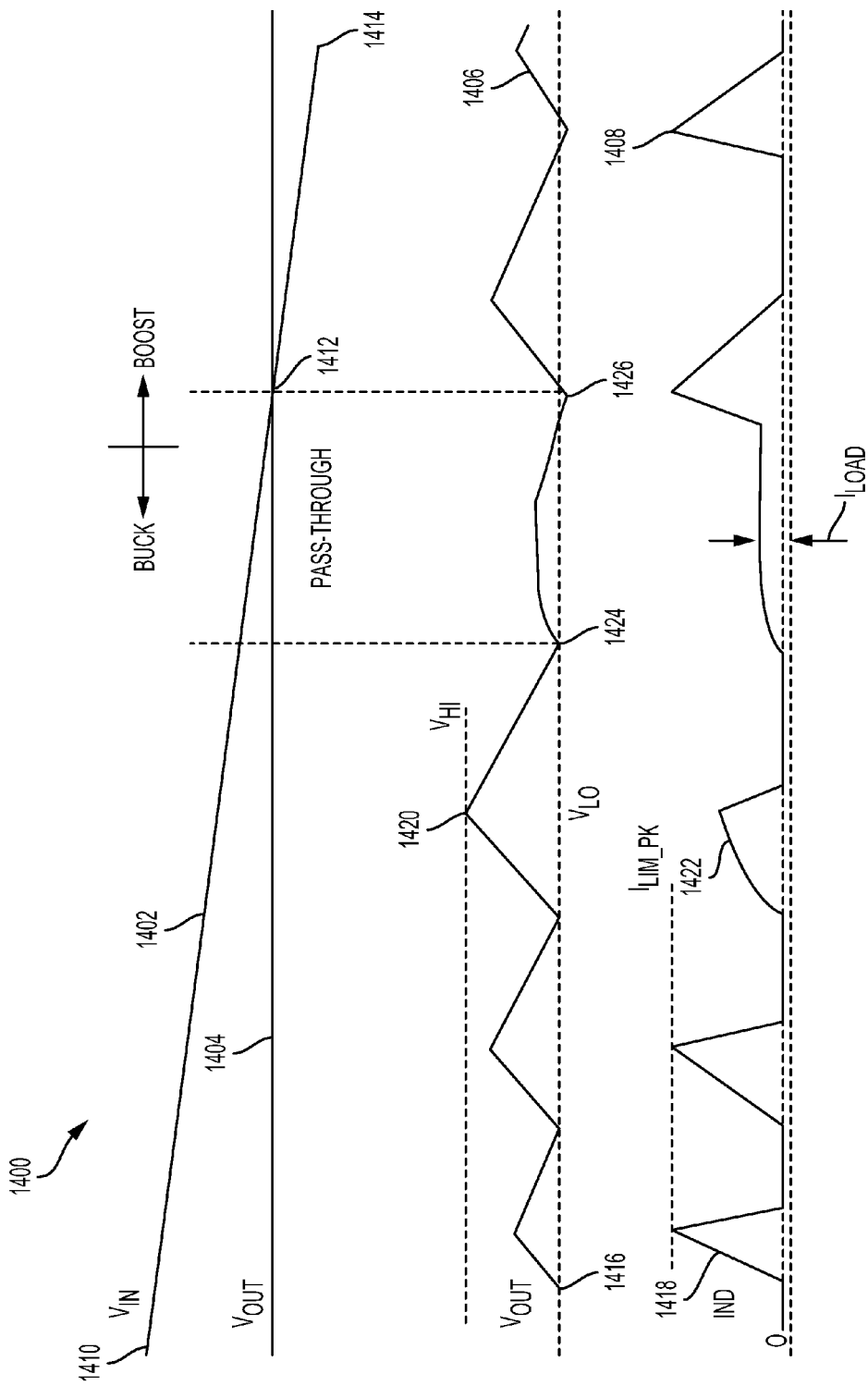
FIG. 14 illustrates a waveform of the buck-or-boost converter in accordance with a pulse frequency modulation implementation.

FIG. 14 illustrates a waveform 1400 of the buck-or-boost converter in accordance with a pulse frequency modulation implementation. The waveform includes a first graph 1402 of an input voltage $V_{IN}$ of the buck-or-boost converter and a second graph 1404 of an output voltage $V_{OUT}$ that is constant. Although $V_{OUT}$ is illustrated as a constant, it is to be understood that that $V_{OUT}$ can be regulated into a window as illustrated in a third graph 1406. The third graph 1406 illustrates the output voltage VouT regulated into a window (e.g., $V_{LO}$<$V_{OUT}$<$V_{HI}$) when the input voltage $V_{IN}$ and the output voltage $V_{OUT}$ changes during operation of the buck-or-boost converter. The waveform 1400 also includes a fourth graph 1408 of current sensed at the inductor 1212 when the input voltage $V_{IN}$ and the output voltage $V_{OUT}$ changes during operation of the buck-or-boost converter.

At a given cycle of a voltage device (e.g., battery), the input voltage $V_{IN}$ starts at a high voltage (e.g., at point 1410), gradually decreases as the battery discharges until the input voltage $V_{IN}$ is equal to the output voltage $V_{OUT}$ or until the first graph 1402 of the input voltage $V_{IN}$ crosses the second graph 1404 of the output voltage $V_{OUT}$ at point 1412. The input voltage $V_{IN}$ then continues to gradually decrease below the output voltage $V_{OUT}$ until it reaches point 1414. In PFM operation, when the output voltage $V_{OUT}$ falls below (or is equivalent to) a low threshold $V_{LO}$ (e.g., at point 1416) an injection of current is provided at the input to elevate the output voltage $V_{OUT}$ above $V_{LO}$, as shown by the rise in the inductor current at point 1418. In some instances, a single pulse of current is provided and is enough to elevate the output voltage $V_{OUT}$ above $V_{LO}$. In other instances, however, multiple pulses may be specified to elevate the output voltage $V_{OUT}$ above $V_{LO}$.

In the buck operation, as the first graph 1402 approaches the second graph 1404, the difference in between the input voltage $V_{IN}$ and the output voltage $V_{OUT}$ gets smaller and smaller, until the input voltage $V_{IN}$ is equal to the output voltage $V_{OUT}$ at point 1412. For example, the voltage difference corresponds to a voltage difference across the inductor (e.g., 1212). As a consequence, the voltage across the inductor is significantly reduced causing the inductor current and corresponding slope to be reduced, as shown at point 1422. Thus, the out voltage $V_{OUT}$ reaches the high threshold at point 1420 before the inductor current reaches the current limit (e.g. ILIM_PK). For example, under these circumstances, the current limit is not attained because the output voltage $V_{OUT}$ reaches the high threshold first. The attained high threshold voltage $V_{HI}$ (by the output voltage $V_{OUT}$) serves as an option to the current limit ILIM_PK to initiate the discharge the inductor current IND.

When the input voltage $V_{IN}$ is almost equal to the output voltage $V_{OUT}$ (e.g., at point 1424), the analog control loop turns on and tries to cause the generation of the inductor current IND. However, the voltage drop across the inductor is too small, and as a result, the inductor current IND is not built up. Meanwhile, the inductor provides a load current, ILOAD, while a node of the input voltage $V_{IN}$, in this case, is shorted to a node of the output voltage $V_{OUT}$. For example, between points 1424 and 1426, the output voltage $V_{OUT}$ follows the input voltage $V_{IN}$ and is substantially equal to the input voltage $V_{IN}$. Accordingly, a pass-through mode for PFM is established between points 1424 and 1426. Eventually, the output voltage $V_{OUT}$ crosses the low threshold $V_{LO}$ at point 1426 and buck-or-boost converter enters into a boost operation.

Aspects of the present disclosure are directed to a very low power mode operation for non-inverting buck-or-boost converters for power management integrated circuits for entering and exiting sleep mode. In some implementations, the power management integrated circuit (PMIC) of the power management system may decide to enter a sleep mode. The PMIC may decide to enter the sleep mode while the buck-or-boost converter is operating in accordance with a buck mode of operation. As a result, the PMIC may command or cause the buck-or-boost converter to enter a pass-through mode prior to entering the sleep mode. Causing the buck-or-boost converter to enter into the pass-through mode is one way to keep the output voltage $V_{OUT}$ biased up to avoid the rail from collapsing to ground while in sleep mode. For the pass-through mode, a node corresponding to the input voltage $V_{IN}$ and a node corresponding to the output voltage $V_{OUT}$ are shorted such that no current flows through an inductor (e.g., 1212) between the two nodes. To achieve the pass-through mode, the high side buck transistor and a high side boost transistor are turned on. However, turning on the high side buck transistor and a high side boost transistor at once may cause inductor current spike. It is desirable to avoid the inductor current spike.

In one aspect of the disclosure, the output voltage $V_{OUT}$ transitions (e.g., in response to a command or control signal) from a regulation point to a new point equivalent to the battery voltage, which corresponds to $V_{IN}$. Only when this transition occurs are the high side buck transistor and a high side boost transistor turned on when the output voltage $V_{OUT}$ attains the battery voltage to allow the PMIC to enter sleep mode or low power mode while mitigating the inductor current spike. When a command is received to resume operation (or turn on again) from the sleep mode, the output voltage $V_{OUT}$ is unknown, because the battery voltage is discharged while the PMIC is in sleep mode. Aspects of the present disclosure are directed to an implementation for verifying the output voltage $V_{OUT}$ when the command is received to resume operation. First, the battery voltage is detected, then the buck-or-boost converter or circuitry is pre-biased to operate $V_{OUT}$ in a voltage equivalent to the battery voltage and only then is the switching to bring the output voltage back to regulation started. Thus, the battery voltage is determined before sleep mode and after a command to resume operation is received prior to resuming operation. The aspects of the disclosure achieve a smooth transition by avoiding the generation of high inductor current spikes.

Other aspects of the present disclosure are directed to adapting to soft-start for non-inverting buck-or boost converters. A soft-start of the buck-or boost converter is implemented to avoid high in-rush current at the input of the buck-or boost converter. Different implementations are used to slowly step the input voltage $V_{IN}$ of the buck-or boost converter up to the target during start. In one aspect of the present disclosure, the buck-or-boost converter is soft-started with a pre-charged output voltage $V_{OUT-PRE}$. The pre-charged output voltage can be at any value from 0 up to a value above the target regulation point. Upon a startup command, the buck-or-boost converter determines the voltage of the output voltage $V_{OUT}$, then pre-biases the internal circuitry to the equivalent output voltage level and only then does the buck-or-boost converter start switching to soft start the output voltage $V_{OUT}$ to the target voltage.

Another aspect of the present disclosure is directed to high frequency pulse width modulation (PWM) ramp generation for a buck-or-boost converter. A ramp generator (e.g., ramp generator 1244) coupled or integrated into the buck-or-boost converter circuit generates a ramp signal for the buck-or-boost converter. For example, the input boost ramp voltage 1282 and the input buck ramp voltage 1284 may be generated by the ramp generator 1244 or a different ramp generator. To generate the ramp in a first cycle, a capacitor is charged up to a specified voltage and when a reset clock signal is received, the ramp is discharged very fast and then a second ramp cycle is started. To reset the ramp signal very fast, a very strong switch with a very low resistance is specified to discharge the ramp signal very fast. The use of the very strong switch during the fast discharge generates a transient and high current spike. In addition, the low resistance switch creates charge injection when it is turned on and off and causes a disturbance to one or more nodes of the ramp generator. In the buck mode, one or more of the nodes of the ramp generator are relatively low impedance. As a result, noise generated at the one or more nodes because of the low resistance switch is tolerable.

Referring to the boost mode, the reference for the boost mode is a voltage reference generated at an input node of the ramp generator that is controlled to generate a gap between the buck ramp and the boost ramp. However, when the capacitor for generating the ramp signal is discharged very fast, the input node is subject to voltage transients. To mitigate the instability, two or more capacitors (e.g., a first capacitor and a second capacitor) are introduced to the ramp generator to achieve a buck-or-boost complimentary ramp. In one aspect of the present disclosure, the first capacitor is charged in the first cycle and the second capacitor is charged in the second cycle and so on. By alternatively charging the first cycle and the second cycle of the ramp generator, the ramp generator can be designed without the use of the very strong switch with a very low resistance. Further, alternately charging multiple capacitors to generate the ramp signal reduces or removes the transient and high current spike. As a result, the power supply for the ramp generator is more stable. This technique is also applicable to high frequency switching where the time to discharge the capacitor is reduced.

Figure 15:
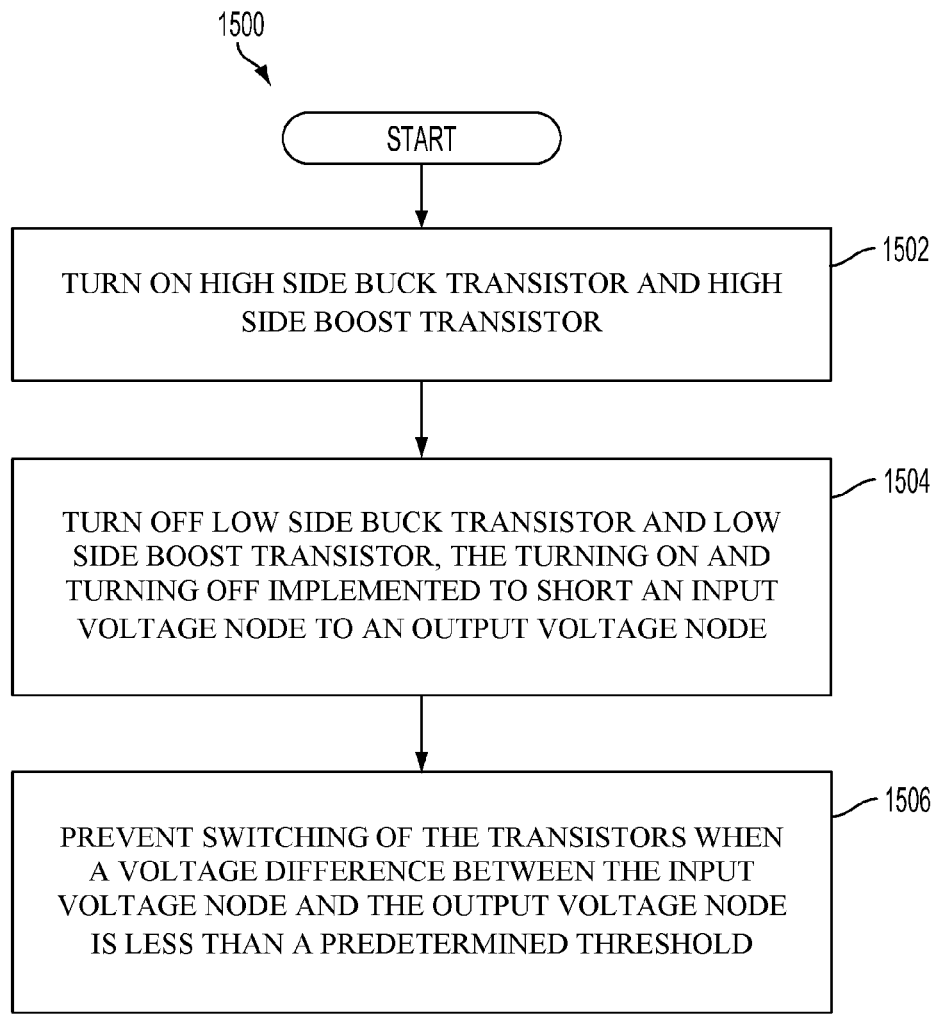
FIG. 15 depicts a simplified flowchart of a voltage regulation method according to one aspect of the disclosure.

FIG. 15 depicts a simplified flowchart of a voltage regulation method 1500, according to one aspect of the disclosure. At block 1502, a high side buck transistor and a high side boost transistor are turned on. At block 1504, a low side buck transistor and a low side boost transistor are turned off. The turning on and the turning off are implemented to short an input voltage node to an output voltage node. At block 1506, switching of the transistors when a voltage difference between the input voltage node and the output voltage node is less than a predetermined threshold is prevented.

In one aspect of the present disclosure, the remote units 1020, 1030, and 1050 of FIG. 10 include IC devices 1025A, 1025C, and 1025B that include the disclosed buck-or-boost switching regulator circuit. It will be recognized that other devices may also include the disclosed buck-or-boost switching regulator circuit, such as the base stations, switching devices, and network equipment. Aspects of the disclosure may be suitably employed in many devices, which include the disclosed buck-or-boost switching regulator circuit.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic device, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general-purpose or special-purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD) and Blu-ray disc where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "a step for."

What is claimed is:

1. A power management system, comprising:
   a plurality of low power client devices coupled to a power grid of the power management system;
   a high power consumption client device coupled to the power grid of the power management system; and
   a power management integrated circuit (PMIC) supplying power to the power grid, the PMIC comprising:
   a buck-or-boost switching regulator circuit including a load current adjustment device configured to de-rate the high power consumption device when a sum of the current consumed by the high power consumption device and the low power client devices is above a predetermined threshold.

2. The power management system of claim 1, in which the plurality of low power client devices comprise a plurality of high priority client devices and in which the high power consumption client device comprises a low priority client device.

3. The power management system of claim 2, further comprising:
   a voltage arbitration device configured to adjust a lowest voltage allocated to the low priority client device by ensuring the lowest voltage is sufficient to satisfy the voltage specifications of each of the plurality of high priority client devices.

4. The power management system of claim 1, in which an average current of an inductor coupled to the load current adjustment device corresponds to a consumed current by the plurality of low power client devices and the high power consumption device.

5. The power management system of claim 1, in which the power grid couples the high power consumption client device and the low power client devices to the buck-or-boost switching regulator circuit, in which the load current adjustment device de-rates the high power consumption device to prevent the power grid from collapsing.

6. A power management method, comprising:
   de-rating a high power consumption device when a current consumed by the high power consumption device is above a predetermined high power device threshold, and
   adjusting a voltage allocated to the high power consumption device according to a voltage headroom when a predetermined minimum voltage to operate each of a plurality of low power client devices coupled to a power grid is satisfied.

7. The power management method of claim 6, further comprising determining a consumed current by the plurality of low power client devices and the high power consumption device based at least in part on an average current of an inductor coupled.

8. The power management method of claim 6, further comprising indicating available power to the high power consumption device when the current consumed by the plurality of low power client devices and the high power consumption device is below a predetermined system threshold.

9. The power management method of claim 6, further comprising increasing current to the high power consumption device in response to a request from the high power consumption device when the current consumed by the plurality of low power client devices and the high power consumption device is less than a predetermined system threshold.

10. The power management method of claim 6, further comprising reducing current consumed by the high power consumption device when the current consumed by the plurality of low power client devices and the high power consumption device is approaching a current limit to prevent the current consumed by the plurality of low power client devices and the high power consumption device from exceeding the current limit.

11. A power management system, comprising:
    a plurality of low power client devices coupled to a power grid of the power management system;
    a high power consumption device coupled to the power grid of the power management system; and
    means for de-rating the high power consumption device when a current consumed by the high power consumption device is above a predetermined high power device threshold, and
    means for adjusting a voltage allocated to the high power consumption device according to a voltage headroom when a predetermined minimum voltage to operate each of the plurality of low power client devices coupled to the power grid is satisfied.

12. The power management system of claim 11, further comprising means for determining a consumed current by the plurality of low power client devices and the high power consumption device based at least in part on an average current of an inductor coupled.

13. The power management system of claim 11, further comprising means for indicating available power to the high power consumption device when the current consumed by the plurality of low power client devices and the high power consumption device is below a predetermined system threshold.

14. The power management system of claim 11, further comprising means for increasing current to the high power consumption device in response to a request from the high power consumption device when the current consumed by the plurality of low power client devices and the high power consumption device is less than a predetermined system threshold.

15. The power management system of claim 11, further comprising means for reducing current consumed by the high power consumption device when the current consumed by the plurality of low power client devices and the high power consumption device is approaching a current limit to prevent the current consumed by the plurality of low power client devices and the high power consumption device from exceeding the current limit.

16. A non-transitory computer-readable storage medium having non-transitory program code recorded thereon, the program code comprising:
    program code to de-rate a high power consumption device when a current consumed by the high power consumption device is above a predetermined high power device threshold, and
    program code to adjust a voltage allocated to the high power consumption device according to a voltage headroom when a predetermined minimum voltage to operate each of a plurality of low power client devices coupled to a power grid is satisfied.

17. The non-transitory computer-readable storage medium of claim 16, further comprising program code to determine a consumed current by the plurality of low power client devices and the high power consumption device based at least in part on an average current of an inductor coupled.

18. The non-transitory computer-readable storage medium of claim 16, further comprising program code to indicate available power to the high power consumption device when the current consumed by the plurality of low power client devices and the high power consumption device is below a predetermined system threshold.

19. The non-transitory computer-readable storage medium of claim 16, further comprising program code to increase the current to the high power consumption device in response to a request from the high power consumption device when the current consumed by the plurality of low power client devices and the high power consumption device is less than a predetermined system threshold.

20. The non-transitory computer-readable storage medium of claim 16, further comprising program code to reduce the current consumed by the high power consumption device when the current consumed by the plurality of low power client devices and the high power consumption device is approaching a current limit to prevent the current consumed by the plurality of low power client devices and the high power consumption device from exceeding the current limit.

* * * * *